US008862675B1

(12) United States Patent
Coomer et al.

(10) Patent No.: US 8,862,675 B1
(45) Date of Patent: Oct. 14, 2014

(54) METHOD AND SYSTEM FOR ASYNCHRONOUS ANALYSIS OF URLS IN MESSAGES IN A LIVE MESSAGE PROCESSING ENVIRONMENT

(75) Inventors: Graham Coomer, Gloucester (GB); Nicholas Johnston, Cheltenham (GB)

(73) Assignee: Symantec Corporation, Mountain View, CA (US)

( * ) Notice: Subject to any disclaimer, the term of this patent is extended or adjusted under 35 U.S.C. 154(b) by 431 days.

(21) Appl. No.: 13/045,267

(22) Filed: Mar. 10, 2011

(51) Int. Cl.
G06F 15/16 (2006.01)

(52) U.S. Cl.
USPC ........... 709/206; 709/201; 709/224; 370/349; 370/389; 370/401; 455/410

(58) Field of Classification Search
USPC .......... 709/206, 201, 224; 370/349, 389, 401; 455/410
See application file for complete search history.

(56) References Cited

U.S. PATENT DOCUMENTS

| | | | | | |
|---|---|---|---|---|---|
| 6,148,336 | A | * | 11/2000 | Thomas et al. | 709/224 |
| 6,263,364 | B1 | * | 7/2001 | Najork et al. | 709/217 |
| 7,293,063 | B1 | * | 11/2007 | Sobel | 709/206 |
| 7,512,122 | B1 | * | 3/2009 | Olakangil et al. | 370/389 |
| 2001/0007560 | A1 | * | 7/2001 | Masuda et al. | 370/401 |
| 2003/0043777 | A1 | * | 3/2003 | Koponen et al. | 370/349 |
| 2006/0234675 | A1 | * | 10/2006 | Flavin | 455/410 |
| 2007/0005970 | A1 | * | 1/2007 | Trupp et al. | 713/170 |
| 2008/0189350 | A1 | * | 8/2008 | Vasa et al. | 709/201 |
| 2009/0119062 | A1 | * | 5/2009 | Owens et al. | 702/176 |
| 2009/0328219 | A1 | * | 12/2009 | Narayanaswamy | 726/23 |

OTHER PUBLICATIONS

Asuncion, Arthur et al., "Asynchronous Distributed Estimation of Topic Models for Document Analysis," Mar. 18, 2010, pp. 1-16, University of California, Irvine.
Johansen, Dag et al., "WAIF: Web of Asynchronous Information Filters," *Future Directions in Distributed Computing* 2003, 5 pages, Springer-Verlag Berlin, Heidelberg.
Lundh, Frederik, "EffNews Part 1: Fetching RSS Files," 10 pages [online], Sep. 5, 2002, Retrieved on Aug. 31, 2011 from URL: http://effbot.org/zone/effnews-1.htm.
No author provided, "Predictive Sender Profiling," 3 pages [online], Retrieved on Aug. 31, 2011 from URL: http://www.barracudanetworks.com/ns/technology/predictive-sender-profiling.php, Barracuda Networks, Inc.
No author provided, "Trace My IP", 4 pages [online], Retrieved on Aug. 31, 2011 from URL: http://www.tracemyip.org.

* cited by examiner

*Primary Examiner* — Thuong Nguyen
(74) *Attorney, Agent, or Firm* — Wilmer Cutler Pickering Hale and Dorr LLP

(57) ABSTRACT

A method and apparatus for asynchronous analysis of URLs in messages in a live message processing environment whereby an identified URL included in a message identified for further analysis is extracted and prioritized based on one or more prioritization parameters. The URL is then sent from a live message processing stream to a URL analysis process and the live message processing stream is stalled, with respect to that message, until the results of the URL analysis process are received, or until a defined "timeout" period passes. The results, or "verdict", of the URL analysis process are then sent back to the live message processing stream in an asynchronous manner based on the prioritization of the URL. If the results of the URL analysis process are not received by the live message processing stream before the defined "timeout" period passes, then the "best" action is taken based on the best available data/verdict. If the results of the URL analysis process are received by the live message processing stream before the defined "timeout" period passes, then the "best" action is taken based on the verdict provided by the URL analysis process.

13 Claims, 6 Drawing Sheets

US 8,862,675 B1

METHOD AND SYSTEM FOR ASYNCHRONOUS ANALYSIS OF URLS IN MESSAGES IN A LIVE MESSAGE PROCESSING ENVIRONMENT

BACKGROUND OF THE INVENTION

One major problem facing modern computing systems and communications systems is the prevalence of spam messages.

One common form of spam is a message that includes a URL that, when activated, links to one or more websites that include unsolicited, malicious, unwanted, offensive, or nuisance content, such as, but is not limited to: any content that promotes and/or is associated with fraud; any content that includes "work from home" or "be our representative" offers/scams; any content that includes money laundering or so-called "mule spam"; any content that promotes and/or is associated with various financial scams; any content that promotes and/or is associated with any other criminal activity; and/or any content that is unsolicited and/or undesirable, whether illegal in a given jurisdiction or not.

Traditional anti-spam techniques are largely heuristic and involve identifying spam based on analyzing known spam and then creating spam signature files/parameters. Using these traditional anti-spam techniques, a percentage of new spam messages does pass through to "sacrificial" end user machines before the spam is identified as spam and spam signature files/parameters can be created, but, traditionally, once the spam signature files/parameters are identified, future instances of the spam are blocked.

The traditional anti-spam techniques that use spam signature files/parameters are effective so long as the spam signature remains relatively constant for a significant number of messages, i.e., the traditional spam signature files/parameters only work as long as the spam message parameters continue to match the spam signature files/parameters. However, traditional anti-spam heuristic technology is reaching maturity, and spammers now have more knowledge, and skill, than ever before regarding how to avoid detection by traditional anti-spam techniques.

In particular, spammers have recently begun sending very short spam messages, often from semi-legitimate sources, such as webmail providers. As a result, the headers of these spam messages are often legitimate, or semi-legitimate, and the source of the message cannot be readily used as a spam signature parameter without the risk of numerous false positive, i.e., false spam, verdicts.

In addition, many of these very short spam messages contain a URL link and little, or nothing, more. Consequently, these spam messages often include little, or no, spam-related content in the body of the message that could be used to create spam signature files or parameters.

As a result of the situation described above, in more and more cases, the only spam signature parameter available is the URL link included in the message itself. However, the prevalence of URL shortening services has significantly complicated traditional URL analysis. URL shortening services typically provide users, including spammers, the ability to shorten the size, or number of characters, associated with a given URL by providing shortened URLs that map to the longer actual URL. URL shortening services are legitimately used to allow the URL to be included in text size limited communications, such as Twitter™. On the other hand, spammers can use URL shortening services to mask an actual spam URL by having multiple shortened URLs created that map to the actual URL.

The prevalence of URL shortening services, and the fact that spammers are tending towards using a given URL in only a very small number of messages, in some cases in only a single message, traditional URL-based spam signatures, and associated URL block lists, are ineffective because each URL-based spam signature will only block a very small number of messages, if any, before it is irrelevant. Consequently, reactively blocking a URL after the message containing it has been sent is often entirely ineffective for this type of spam.

Creating very short spam messages, sending them from semi-legitimate sources, and with shortened URLs that are included in/with very few spam messages, is relatively simple and often cost free to the spammer. Consequently, from a spammer's perspective, these methods of distributing spam, and defeating spam protection systems, are extremely effective. As a result, using currently available spam detection systems and methods, many types of spam, and particularly newer forms of spam, are extremely difficult to identify and isolate and, therefore, many of these nuisance, and at times harmful, messages still find their way to thousands of victims each year. Clearly, this is a far from ideal situation for the victims, but it is also a problem for all users of e-mail, and other message systems, who must suffer with the delays of false positives and/or must be wary of all messages, even those of seemingly legitimate origin and intent.

SUMMARY

According to one embodiment, a method and system for asynchronous analysis of URLs in messages in a live message processing environment includes a process for asynchronous analysis of URLs in messages in a live message processing environment whereby an incoming message enters a live message processing stream. In one embodiment, the message is analyzed to determine if the message contains any URLs and/or includes any defined further analysis message identification parameters such as, but not limited to: very little or no text, other that the URL, in the message body; senders with mixed reputation, such as web-based e-mail providers, being associated with the message, especially free web e-mail sources; the presence of shortened URLs and/or evidence of the use of a URL shortening service; the presence of free web hosting services including, but not limited to, "traditional" free hosting services, such as Tripod™, that host a whole site, as well as blogging platforms, such as Livejournal™, and document hosting services, such as Google Docs™ and Box-.net™, and/or any site which freely allows users to upload or otherwise publish any content; or any other message parameters deemed to make a message worthy of further analysis.

In one embodiment, any URLs included in a message identified for further analysis are extracted. In one embodiment, a message identified for further analysis is subjected to initial anti-spam analysis in the live message processing stream that can include checking any extracted URLs against a URL block list and/or performing various forms of non-URL-based anti-spam analysis. In one embodiment, if, at any point, a message is determined to be potential spam, protective action is taken based on the best spam data/verdict available, and/or the basis of the determination that the message is potential spam.

In one embodiment, if a message identified for further analysis is not initially determined to be potential spam, the extracted URLs are prioritized based on one or more prioritization parameters such as, but not limited to, the presence of URL shortening links, or any other prioritization parameters that indicate the analysis of the extracted URL should be, or need not be, prioritized for expedited transmission, and/or verdict rendering.

In one embodiment, each extracted and prioritized URL is then sent from the live message processing stream to a URL analysis process. In one embodiment, the live message processing stream is then stalled, or shifted to a different analysis track, with respect to that message, until the results of the URL analysis process are received, or until a defined "timeout" period passes.

In one embodiment, in the course of the URL analysis process, the URLs are analyzed by one or more URL analysis methods such as, but not limited to, analyzing portions of the URL, and/or activating the URL link to the associated location/website, and/or analyzing the contents of the web page linked to by the URL. In one embodiment, the results, or "verdict", of the URL analysis process are sent back to the live message processing stream. In one embodiment, if a URL is a "priority URL" that is prioritized for expedited transmission and/or verdict rendering, then the verdict of either "spam" or "non-spam" is provided to the live message processing stream on an expedited basis/timeframe and, if a URL is deemed spam, the URL is added to a URL block list, and/or one or more databases associated with a larger, or global, spam identification system.

In one embodiment, if a URL is a "non-priority URL" that is not prioritized for expedited transmission and/or verdict rendering, then the verdict of either "spam" or "non-spam" is provided to the live message processing stream on an standard basis/timeframe and, if a URL is deemed spam, the URL is added to the URL block list, and/or one or more databases associated with a larger, or global, spam identification system. In one embodiment, if the results of the URL analysis process are not received by the live message processing stream before the defined "timeout" period passes, then the "best" action is taken based on the best available data/verdict. In one embodiment, the best action may be, but is not limited to: allowing the message to pass to the user; blocking the message; and/or making a final static check of a known spam list and/or blocked URL list. In one embodiment, if the results of the URL analysis process are received by the live message processing stream before the defined "timeout" period passes, then the "best" action is taken based on the verdict provided by the URL analysis process.

Using the method and system for asynchronous analysis of URLs in messages in a live message processing environment, as discussed herein, potential spam messages, even very short spam messages, from semi-legitimate sources, and with shortened URLs that are included in very few spam messages, can be reliably identified in a live message stream, i.e., in relative "real time". In addition, using the method and system for asynchronous analysis of URLs in messages in a live message processing environment, as discussed herein, both messages and URLs are analyzed and/or filtered to identify those messages and URLs requiring further analysis, thereby conserving resources and minimizing delays. In addition, in one embodiment, URLs identified as requiring further analysis are prioritized and analyzed at the same time non-URL-based anti-spam analysis is conducted in the live message stream. Consequently, the delay to the end user is again minimized. In addition, using one embodiment of the method and system for asynchronous analysis of URLs in messages in a live message processing environment, discussed herein, the timeout period can be set, and/or adjusted, so that the maximum delay to the end user is controlled and/or adjustable.

As a result, using the method and system for asynchronous analysis of URLs in messages in a live message processing environment, as discussed herein, far more spam messages can be identified and stopped than is possible using currently available methods and systems.

Figure 1:
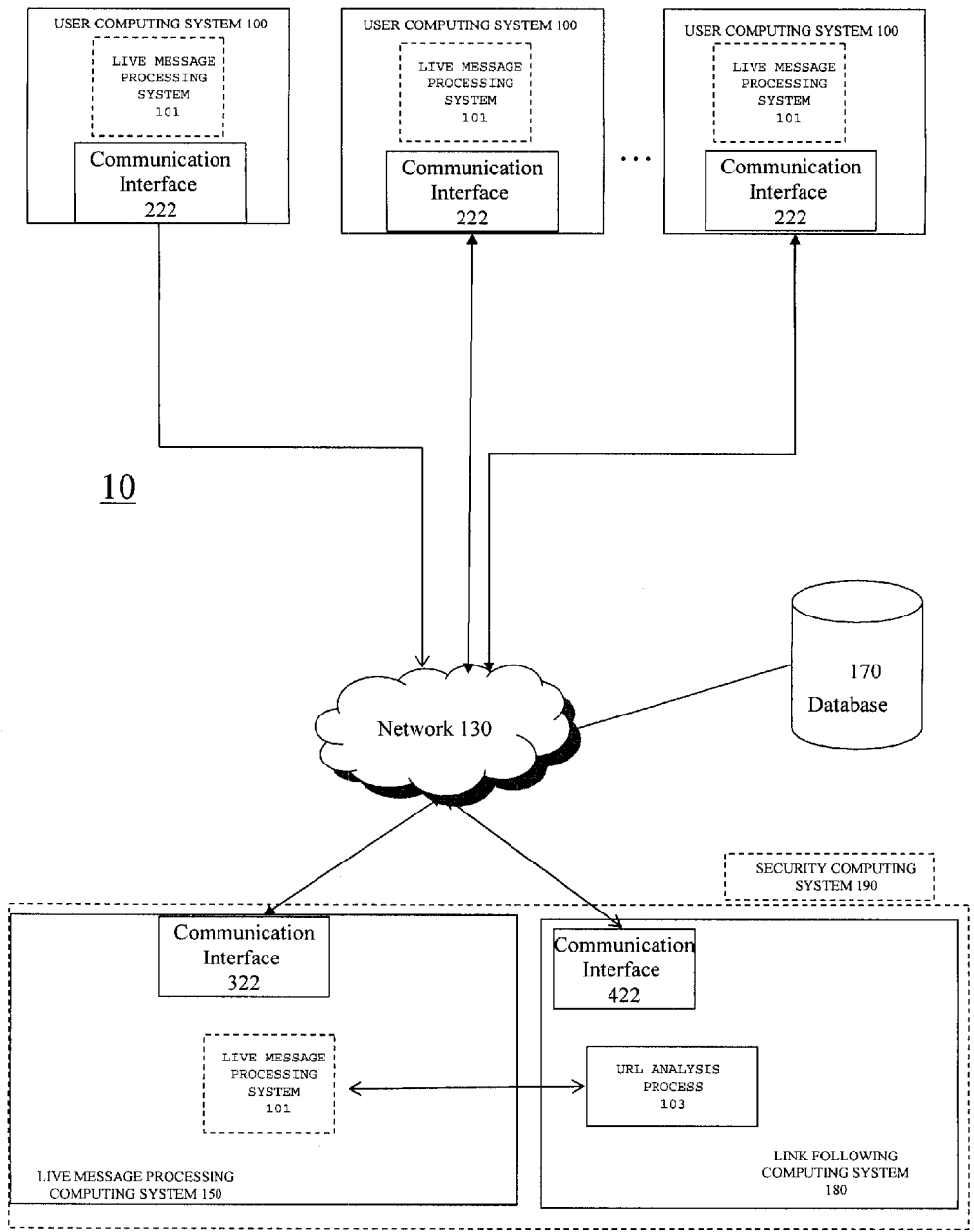
FIG. 1 is a block diagram of an exemplary hardware architecture for implementing one embodiment including user computing systems, a network or cloud, a database, a live message processing computing system, and a link following computing system, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment, a method and system for asynchronous analysis of URLs in messages in a live message processing environment includes a process for asynchronous analysis of URLs in messages in a live message processing environment whereby an incoming message enters a live message processing stream of a live message processing system.

In various embodiments, the live message processing system is an e-mail processing system. In various embodiments, the live message processing system is an e-mail processing system that is part of a security system implemented to analyze all e-mails coming into one or more user computing systems.

In various embodiments, the live message processing system is implemented, at least in part, on a user computing system. In various embodiments, the live message processing system is implemented, at least in part, on a live message processing computing system. In various embodiments, the live message processing system is implemented, at least in part, on a security computing system.

In one embodiment, the message is initially analyzed to determine if the message contains any URLs and/or includes any defined further analysis message identification parameters.

In various embodiments, the further analysis message identification parameters include, but are not limited to, any one or more of: the message including very little, or no, text in the message body other that the URL; the presence of senders with mixed reputation, such as web-based e-mail providers, being associated with the message, especially free web e-mail sources; the presence of shortened URLs and/or evidence of the use of a URL shortening service; the presence of free web hosting services including, but not limited to, "traditional" free hosting services, such as Tripod™, that host a whole site, as well as blogging platforms, such as Livejournal™, and document hosting services, such as Google Docs™ and Box-.net™, and/or any site which freely allows users to upload or otherwise publish any content; or any other message parameters deemed to make a message worthy of further analysis.

In one embodiment, any URL included in a message identified for further analysis is extracted. Various methods, means, mechanisms, processes, and procedures for extracting URLs from messages are known in the art, consequently, a more detailed discussion of specific methods, means, mechanisms, processes, and procedures for extracting URLs from messages is omitted here to avoid detracting from the invention.

In one embodiment, a message identified for further analysis is subjected to initial anti-spam analysis in the live message processing stream that can include checking any extracted URLs against a URL block list and/or performing various types of non-URL-based anti-spam analysis.

Various forms of non-URL-based anti-spam analysis are known in the art such as, but not limited to: whitelist filtering; traditional heuristic filtering; dynamic feedback-based heuristic filtering; analysis of the text in the message body, headers, and footers; metadata analysis; and/or any combination of non-URL-based anti-spam analysis methods, as discussed herein, and/or as known in the art at the time of filing, and/or as developed after the time of filing.

In one embodiment, if, at any point, the message is determined to be potential spam, protective action is taken based on the best spam data/verdict available, and/or the basis of the determination that the message is potential spam.

In one embodiment, if the message identified for further analysis is not initially determined to be potential spam, the extracted URL is prioritized based on one or more prioritization parameters such as, but not limited to, the presence of shortened URLs and/or evidence of the use of a URL shortening service, or any other prioritization parameters that indicate the analysis of the extracted URL should be, or need not be, prioritized for expedited transmission and/or verdict rendering.

In one embodiment, the extracted, and now prioritized, URL is sent from the live message processing stream, and the live message processing system, to a URL analysis process. In one embodiment, once the extracted and prioritized URL is sent from the live message processing system to the URL analysis process, the live message processing stream is stalled, or proceeds on a parallel analysis track, with respect to that message until the results of the URL analysis process are received, or until a defined "timeout" period passes.

In one embodiment, once the extracted and prioritized URL is sent from the live message processing system to the URL analysis process, the live message processing stream is stalled, or proceeds on a parallel analysis track, with respect to that message for an initial wait period that is a fraction of the "timeout" period. In one embodiment, a check is made at "poll period" intervals to determine if the result, or verdict, is available from the URL analysis process. In various embodiments, the "poll period" is a fraction of the "timeout" period. In various embodiments, the verdict check is made at "poll period" intervals up to the end of the timeout period.

In various embodiments, the timeout period can be any period desired by the provider of the process for asynchronous analysis of URLs in messages in a live message processing environment. In some embodiments, the timeout period can be any period desired by one or more users of the process for asynchronous analysis of URLs in messages in a live message processing environment and can be adjusted as desired. In one embodiment, the timeout period is ¼ of a second. In one embodiment, the timeout period is ⅛ of a second.

In one embodiment, in the course of the URL analysis process, the extracted and prioritized URL is analyzed by one or more URL analysis methods such as, but not limited to: analyzing various portions of the URL; activating the URL link to the associated location/website; and/or analyzing the contents of the web page linked to by the URL.

In one embodiment, in the course of the URL analysis process, simply retrieving the content at a URL will not reliably yield page content because many URLs redirect to other URLs via many different methods such as HTTP redirect, HTML meta redirect, JavaScript redirect, etc. In addition, the number of redirects is effectively unlimited, and some spammers use a high number of redirects to frustrate analysis. In addition, it is not sufficient to simply have lists of sites for which redirects should be handled as there are too many sites, and too many different methods for redirection.

In these cases, in the course of the URL analysis process, a set of processing rules are applied to results of HTTP requests in a link-following system. In one embodiment, in the course of the URL analysis process, the HTTP response headers and content are analyzed to determine if the response is a redirect, the redirect is followed, and the process is repeated as often as necessary (up to a limit), to obtain the page content.

In one embodiment, the results, or "verdict", of the URL analysis process are sent back to the live message processing system and the live message processing stream.

In one embodiment, if the URL is a "priority URL" that is prioritized for expedited transmission and/or verdict rendering, then the verdict of either "spam" or "non-spam" from the URL analysis process is provided to the live message processing stream on an expedited basis/timeframe and, if the URL is deemed spam, the URL is added to a "real-time" updated URL block list, and/or one or more databases associated with a larger, or global, spam identification system.

In one embodiment, if the URL is a "non-priority URL" that is not prioritized for expedited transmission and/or verdict rendering, then the verdict of either "spam" or "non-spam" is provided to the live message processing stream on an standard basis/timeframe and, if the URL is deemed spam, the URL is added to the URL block list, and/or one or more databases associated with a larger, or global, spam identification system.

In one embodiment, if the results of the URL analysis process are not received by the live message processing stream before the defined "timeout" period passes, then the "best" action is taken based on the best available data/verdict. In various embodiments, the best action may be, but is not limited to: allowing the message to pass to the user computing system, thereby risking passing on spam messages; blocking the message from the user computing system, thereby risking the blocking of legitimate messages; and/or making a final static check of a known spam list and/or the updated blocked URL list.

In one embodiment, if the results of the URL analysis process are received by the live message processing stream before the defined "timeout" period passes, then the "best" action is taken based on the verdict provided by the URL analysis process.

FIG. 1 shows a block diagram of an exemplary hardware system 10 suitable for implementing one embodiment of a process for asynchronous analysis of URLs in messages in a live message processing environment, such as exemplary process 500 of FIG. 5A and FIG. 5B discussed below. Returning to FIG. 1, exemplary hardware system 10 includes: one or more user computing system(s) 100, including communication interface(s) 222, and, in one embodiment, all, or part, of live message processing system 101; live message processing computing system 150, including communication interface 322 and, in one embodiment, all, or part, of live message processing system 101; link following computing system 180 including communication interface 422 and URL analysis process 103; and database 170; all communicating via communication interfaces 222, 322, 422, and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as live message processing computing system 150 and/or link following computing system 180 (discussed below) or any one or more of other user computing system(s) 100.

As used herein, the term "computing system", such as is included in the terms "user computing system", "live message processing computing system", and "link following computing system" includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein and/or as known in the art at the time of filing and/or as developed thereafter, that includes components that can execute all, or part, of a process for asynchronous analysis of URLs in messages in a live message processing environment in accordance with at least one of the embodiments as described herein. A more detailed discussion of a user computing system(s) 100, on which a live message processing system 101 is implemented, is provided below with respect to FIG. 2.

Returning to FIG. 1, in one embodiment, live message processing computing system 150 is any computing system as defined herein and/or as known in the art at the time of filing and/or as developed thereafter, that includes components that can execute all, or part, of a process for asynchronous analysis of URLs in messages in a live message processing environment in accordance with at least one of the embodiments as described herein and is accessible by, controlled by, and/or otherwise associated with, a security system provider. As used herein, a security system provider includes, but is not limited to, any party, person, application, system, or entity that desires to identify and block the transmission of spam and/or scam e-mails.

In one embodiment, live message processing computing system 150 is representative of two or more live message processing computing systems. In one embodiment, live message processing computing system 150 is a client computing system associated with one or more server computing systems. In one embodiment, live message processing computing system 150 is a server computing system that is, in turn, associated with one or more client computing systems that are users of one more security systems provided through, or monitored by, the security system provider associated with live message processing computing system 150. In one embodiment, live message processing computing system 150 is part of a cloud computing environment. A more detailed discussion of a live message processing computing system 150, on which a live message processing system 101 is implemented, is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100, and/or live message processing computing system 150, and/or link following computing system 180, or a distributed database, or an external and/or portable hard drive. In one embodiment, database 170 is a webpage sever through which access to webpages are provided in response to the activation of URLs, such as URLs included in messages, and/or extracted from messages.

In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for asynchronous analysis of URLs in messages in a live message processing environment, and/or a provider of a security system, and/or a live message processing computing system 150, and/or link following computing system 180. In one embodiment, database 170 is part of a cloud computing environment.

In one embodiment, computing system(s) 100, live message processing computing system 150, link following computing system 180, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, live message processing computing system 150, link following computing system 180, and database 170, are coupled in a cloud computing environment.

As also shown in FIG. 1, in one embodiment, live message processing computing system 150 and link following computing system 180 are both part of a single security computing system 190 that is capable of performing the tasks/functions of both live message processing computing system 150 and link following computing system 180, and live message processing system 101 and URL analysis process 103.

Figure 2:
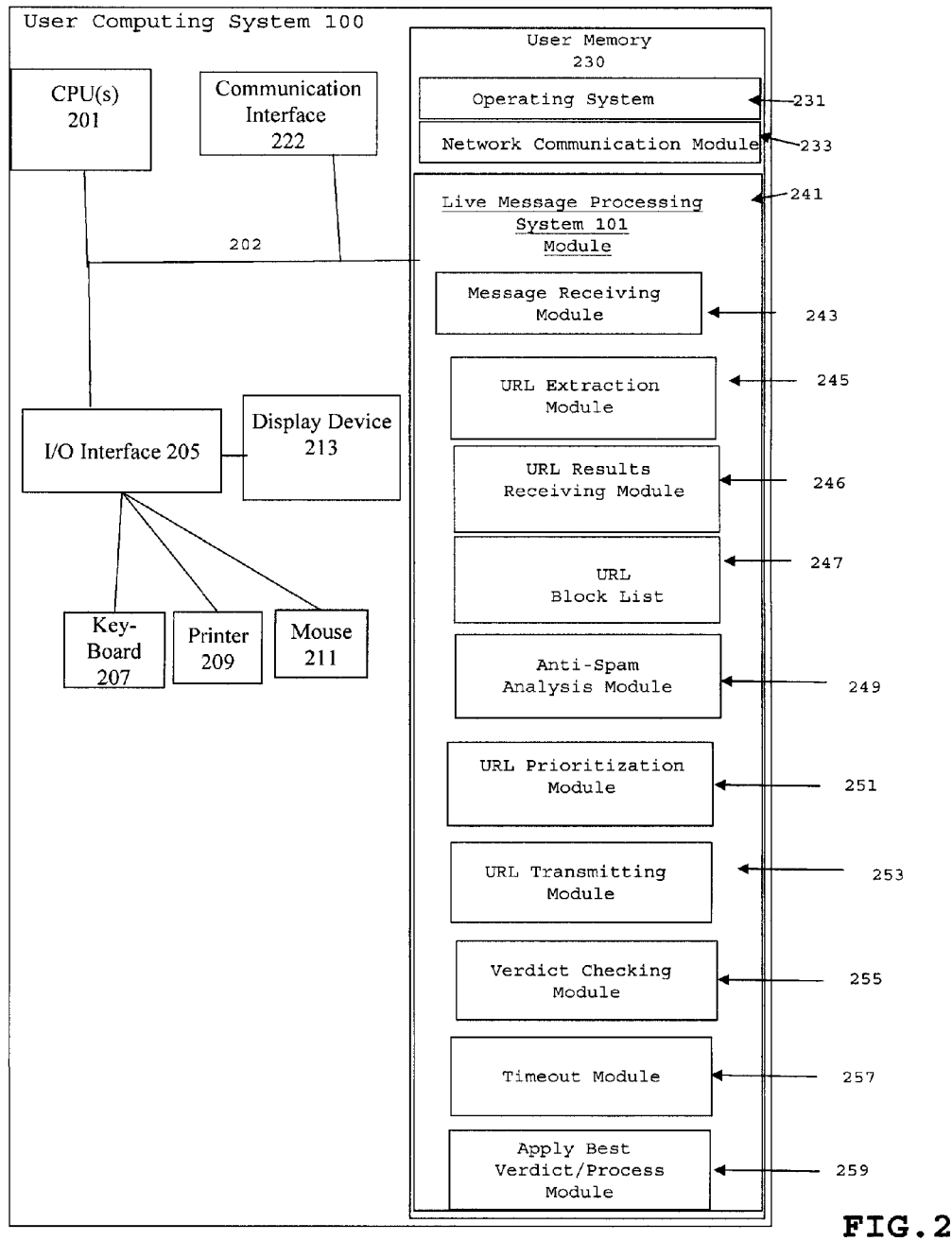
FIG. 2 is a block diagram of an exemplary user computing system of FIG. 1, wherein at least part of a process for asynchronous analysis of URLs in messages in a live message processing environment, including a live message processing system, is implemented in accordance with one embodiment.

FIG. 2 is a more detailed block diagram of an exemplary user computing system(s) 100. As seen in FIG. 2, in one embodiment, user computing system(s) 100 include(s) one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202.

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2), and/or 301 (FIG. 3), and/or 401 (FIG. 4): operating system 231 that includes procedures, data, and/or instructions for handling various services and performing/coordinating hardware dependent tasks; network communications module 233 that includes procedures, data, and/or instructions, for, along with communication interface 222, connecting user computing system(s) 100 to other computing systems, such as other user computing system(s) 100, and/or live message processing computing system 150, and/or link following computing system 180 of FIG. 1, and/or a network, such as network 130 of FIG. 1, and/or a database, such as database 170 of FIG. 1; and live message processing system 101 module 241 (FIG. 2) that includes procedures, data, and/or instructions, for implementing and operating a live message processing system and stream for intercepting and/or analyzing e-mails, or other messages, being sent to, or through, user computing system(s) 100, and/or live message processing computing system 150 of FIG. 1, to identify spam and/or scam e-mails and to take one or more protective measures.

As also seen in FIG. 2, in one embodiment, live message processing system 101 module 241 of user memory 230 includes message receiving module 243 that includes procedures, data, and/or instructions for receiving messages sent to user computing system(s) 100 via communication interface 222 and/or live message processing computing system 150 of FIG. 1.

As also seen in FIG. 2, in one embodiment, live message processing system 101 module 241 of user memory 230 includes URL extraction module 245 that includes procedures, data, and/or instructions for extracting any URL included in a message identified for further analysis. Various methods, means, mechanisms, processes, and procedures for extracting URLs from messages are known in the art, consequently, a more detailed discussion of specific methods, means, mechanisms, processes, and procedures for extracting URLs from messages is omitted here to avoid detracting from the invention.

Figure 4:
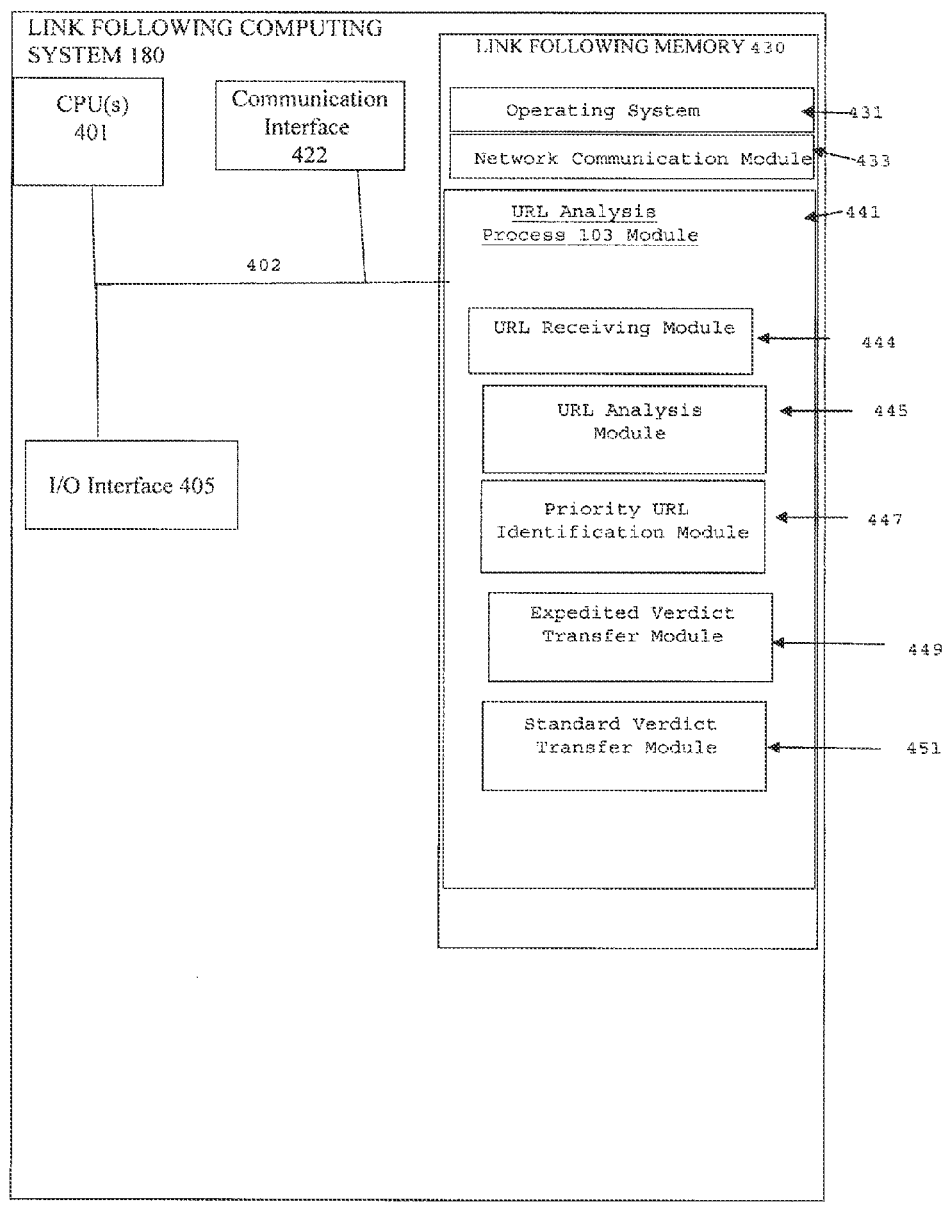
FIG. 4 is a block diagram of an exemplary link following computing system of FIG. 1, wherein at least part of a process for asynchronous analysis of URLs in messages in a live message processing environment, including a URL analysis process, is implemented in accordance with one embodiment.

As also seen in FIG. 2, in one embodiment, live message processing system 101 module 241 of user memory 230 includes URL results receiving module 246 that includes procedures, data, and/or instructions for receiving results of a URL analysis process from expedited and/or standard verdict transfer modules 449 and/or 451, of FIG. 4, and adding the URLs identified as spam to a URL block list, such as URL block list 247.

As also seen in FIG. 2, in one embodiment, live message processing system 101 module 241 of user memory 230 includes URL block list module 247 that includes data indicating known spam URLs to be blocked and checking any extracted URLs against the URL block list.

As also seen in FIG. 2, in one embodiment, live message processing system 101 module 241 of user memory 230 includes anti-spam analysis module 249 that includes procedures, data, and/or instructions for performing non-URL-based anti-spam analysis, such as, but not limited to: whitelist filtering; traditional heuristic filtering; dynamic feedback-based heuristic filtering; analysis of the text in the message body, headers, and footers; metadata analysis; and/or any combination of non-URL-based anti-spam analysis methods, as discussed herein, and/or as known in the art at the time of filing, and/or as developed after the time of filing.

As also seen in FIG. 2, in one embodiment, live message processing system 101 module 241 of user memory 230 includes URL prioritization module 251 that includes procedures, data, and/or instructions for prioritizing an extracted URL based on one or more prioritization parameters such as, the of the use of a URL shortening service, or any other prioritization parameters that indicate the analysis of the extracted URL should be, or need not be, prioritized for expedited transmission and/or verdict rendering.

As also seen in FIG. 2, in one embodiment, live message processing system 101 module 241 of user memory 230 includes URL Transmitting module 253 that includes procedures, data, and/or instructions for sending the extracted, and now prioritized, URL from the live message processing system 101 module 241, and the live message processing stream, to URL analysis process 103 module 441 of FIG. 4, and link following computing system 180. In one embodiment, once the extracted and prioritized URL is sent from the live message processing system to the URL analysis process, the live message processing stream is stalled with respect to that message until the results of the URL analysis process are received, or until a defined "timeout" period passes.

As also seen in FIG. 2, in one embodiment, live message processing system 101 module 241 of user memory 230 includes verdict checking module 255 that includes procedures, data, and/or instructions for checking for, and/or obtaining, verdict data from URL analysis process 103 module 441 of FIG. 4, and link following computing system 180.

As also seen in FIG. 2, in one embodiment, live message processing system 101 module 241 of user memory 230 includes timeout module 257 that includes procedures, data, and/or instructions for establishing, tracking, and using a timeout period that can be any period desired by the provider of the process for asynchronous analysis of URLs in messages in a live message processing environment. In some embodiments, the timeout period can be any period desired by one or more users of the process for asynchronous analysis of URLs in messages in a live message processing environment and can be adjusted as desired. In one embodiment, the timeout period is ¼ of a second. In one embodiment, the timeout period is ⅛ of a second.

As also seen in FIG. 2, in one embodiment, live message processing system 101 module 241 of user memory 230 includes apply best verdict/process module 259 that includes procedures, data, and/or instructions for, in one embodiment, determining and applying the "best" action based on the best available data/verdict if the results of the URL analysis process are not received by the live message processing stream before the defined "timeout" period passes. In various embodiments, the best action may be, but is not limited to: allowing the message to pass to the user computing system, thereby risking passing on spam messages; blocking the message from the user computing system, thereby risking the blocking of legitimate messages; and/or making a final static check of a known spam list and/or the updated blocked URL list. In one embodiment, if the results of the URL analysis process are received by the live message processing stream before the defined "timeout" period passes, then the "best" action is taken based on the verdict provided by the URL analysis process at apply best verdict/process module 259.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system(s) 100, user memory 230, and live message processing system 101 module 241 of user memory 230, is provided below with respect to FIG. 5A and FIG. 5B.

Figure 3:
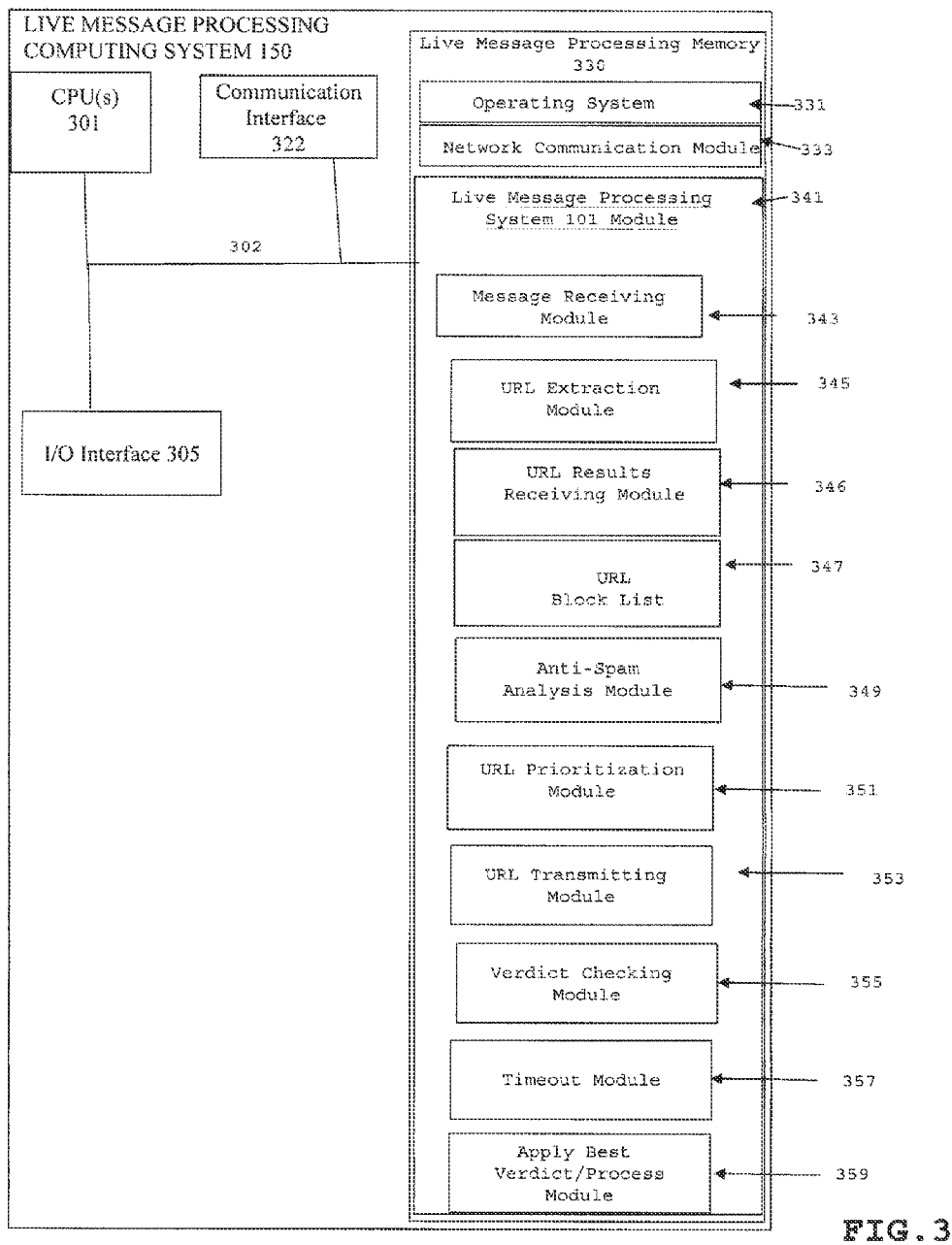
FIG. 3 is a block diagram of an exemplary live message processing computing system of FIG. 1, wherein at least part of a process for asynchronous analysis of URLs in messages in a live message processing environment, including a live message processing system, is implemented in accordance with one embodiment.

FIG. 3 is a more detailed block diagram of an exemplary live message processing computing system 150. As seen in FIG. 3, in one embodiment, live message processing computing system 150 includes one or more Central Processing Unit(s), CPU(s) 301; live message processing memory system 330; at least one communication interface 322; and an Input/Output interface, I/O interface 305, all interconnected by one or more communication buses 302.

As also seen in FIG. 3, in one embodiment, live message processing memory system 330 can store data and/or instructions associated with, but not limited to, the following elements, subsets of elements, and/or super sets of elements for use in processing by one or more processors, such as CPU(s) 201 (FIG. 2), and/or 301 (FIG. 3), and/or 401 (FIG. 4): operating system 331 that includes procedures, data, and/or instructions for handling various services and performing/coordinating hardware dependent tasks; network communications module 333 that includes procedures, data, and/or instructions, for, along with communication interface 322, connecting live message processing computing system 150 to other computing systems, such as user computing system(s) 100 and/or link following computing system 180, and/or a network, such as network 130 of FIG. 1, and/or a database, such as database 170 of FIG. 1; and live message processing system 101 module 341 that includes procedures, data, and/or instructions for scanning e-mails, or other messages, being sent to, or through, user computing system(s) 100 and/or live message processing computing system 150 of FIG. 1 to identify spam and/or scam e-mails and to take one or more protective measures.

As also seen in FIG. 3, in one embodiment, live message processing system 101 module 341 of live message processing memory 330 includes message receiving module 343 that includes procedures, data, and/or instructions for receiving messages sent to user computing system(s) 100 via communication interface 333 and/or live message processing computing system 150 of FIG. 1.

As also seen in FIG. 3, in one embodiment, live message processing system 101 module 341 of live message processing memory 330 includes URL extraction module 345 that includes procedures, data, and/or instructions for extracting any URL included in a message identified for further analysis. Various methods, means, mechanisms, processes, and procedures for extracting URLs from messages are known in the art, consequently, a more detailed discussion of specific methods, means, mechanisms, processes, and procedures for extracting URLs from messages is omitted here to avoid detracting from the invention.

As also seen in FIG. 3, in one embodiment, live message processing system 101 module 341 of live message processing memory 330 includes URL results receiving module 346 that includes procedures, data, and/or instructions for receiving results of a URL analysis process from expedited and/or standard verdict transfer modules 449 and/or 451, of FIG. 4, and adding the URLs identified as spam to a "real-time" updated URL block list, such as URL block list 347.

As also seen in FIG. 3, in one embodiment, live message processing system 101 module 341 of live message processing memory 330 includes URL block list module 347 that includes data indicating known spam URLs to be blocked and checking any extracted URLs against the URL block list.

As also seen in FIG. 3, in one embodiment, live message processing system 101 module 341 of live message processing memory 330 includes anti-spam analysis module 349 that includes procedures, data, and/or instructions for performing non-URL-based anti-spam analysis, such as, but not limited to: whitelist filtering; traditional heuristic filtering; dynamic feedback-based heuristic filtering; analysis of the text in the message body, headers, and footers; metadata analysis; and/or any combination of non-URL-based anti-spam analysis methods, as discussed herein, and/or as known in the art at the time of filing, and/or as developed after the time of filing.

As also seen in FIG. 3, in one embodiment, live message processing system 101 module 341 of live message processing memory 330 includes URL prioritization module 351 that includes procedures, data, and/or instructions for prioritizing an extracted URL based on one or more prioritization parameters such as, the of the use of a URL shortening service, or any other prioritization parameters that indicate the analysis of the extracted URL should be, or need not be, prioritized for expedited transmission and/or verdict rendering.

As also seen in FIG. 3, in one embodiment, live message processing system 101 module 341 of live message processing memory 330 includes URL Transmitting module 353 that includes procedures, data, and/or instructions for sending the extracted, and now prioritized, URL from the live message processing system 101 module 341, and the live message processing stream, to URL analysis process 103 module 441 of FIG. 4, and link following computing system 180. In one embodiment, once the extracted and prioritized URL is sent from the live message processing system to the URL analysis process, the live message processing stream is stalled with respect to that message until the results of the URL analysis process are received, or until a defined "timeout" period passes.

As also seen in FIG. 3, in one embodiment, live message processing system 101 module 341 of live message processing memory 330 includes verdict checking module 355 that includes procedures, data, and/or instructions for checking for, and/or obtaining, verdict data from URL analysis process 103 module 441 of FIG. 4, and link following computing system 180.

As also seen in FIG. 3, in one embodiment, live message processing system 101 module 341 of live message processing memory 330 includes timeout module 357 that includes procedures, data, and/or instructions for establishing, tracking, and using a timeout period that can be any period desired by the provider of the process for asynchronous analysis of URLs in messages in a live message processing environment. In some embodiments, the timeout period can be any period desired by one or more users of the process for asynchronous analysis of URLs in messages in a live message processing environment and can be adjusted as desired. In one embodiment, the timeout period is ¼ of a second. In one embodiment, the timeout period is ⅛ of a second.

As also seen in FIG. 3, in one embodiment, live message processing system 101 module 341 of live message processing memory 330 includes apply best verdict/process module 359 that includes procedures, data, and/or instructions for, in one embodiment, determining and applying the "best" action based on the best available data/verdict if the results of the URL analysis process are not received by the live message processing stream before the defined "timeout" period passes. In various embodiments, the best action may be, but is not limited to: allowing the message to pass to the user computing system, thereby risking passing on spam messages; blocking the message from the user computing system, thereby risking the blocking of legitimate messages; and/or making a final static check of a known spam list and/or the updated blocked URL list. In one embodiment, if the results of the URL analysis process are received by the live message processing stream before the defined "timeout" period passes, then the "best" action is taken based on the verdict provided by the URL analysis process.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary live message processing computing system 150, live message processing memory system 330, and live message processing system 101 module 341 of live message processing memory system 330 is provided below with respect to FIG. 5A and FIG. 5B.

FIG. 4 is a more detailed block diagram of an exemplary link following computing system 180. As seen in FIG. 4, in one embodiment, link following computing system 180 include(s) one or more Central Processing Unit(s), CPU(s) 401; link following memory 430; at least one communication interface 422; and an Input/Output interface, I/O interface 405, all interconnected by one or more communication buses 402.

As also seen in FIG. 4, in one embodiment, link following memory 430 can store data and/or instructions associated with, but not limited to, the following elements, subsets of elements, and/or super sets of elements for processing by one or more processors, such as CPU(s) 201 (FIG. 2), and/or 301 (FIG. 3), and/or 401 (FIG. 4): operating system 431 that includes procedures, data, and/or instructions for handling various services and performing/coordinating hardware dependent tasks; network communications module 433 that includes procedures, data, and/or instructions, for, along with communication interface 422, connecting link following computing system 180 to other computing systems, such as user computing system(s) 100, and/or live message processing computing system 150 of FIG. 1, and/or a network, such as network 130 of FIG. 1, and/or a database, such as database 170 of FIG. 1; and URL analysis process 103 module 441 (FIG. 4) that includes procedures, data, and/or instructions, for implementing and operating a URL analysis process to analyze extracted and prioritized URLs sent from URL transmitting module 253 (FIG. 2) or 353 (FIG. 3) of user computing system(s) 100 (FIG. 1, FIG. 2) or live message processing computing system 150 (FIG. 1, FIG. 3), respectively.

As also seen in FIG. 4, in one embodiment, URL analysis process 103 module 441 of link following memory 430 includes URL receiving module 444 that includes procedures, data, and/or instructions for receiving extracted and prioritized URLs sent from URL transmitting module 253 (FIG. 2) or 353 (FIG. 3) of user computing system(s) 100 (FIG. 1, FIG. 2) or live message processing computing system 150 (FIG. 1, FIG. 3), respectively.

As also seen in FIG. 4, in one embodiment, URL analysis process 103 module 441 of link following memory 430 includes URL analysis module 445 that includes procedures, data, and/or instructions for implementing one or more URL analysis methods such as, but not limited to: analyzing various portions of the URL; activating the URL link to the associated location/website; and/or analyzing the contents of the web page linked to by the URL.

In one embodiment, in the course of the URL analysis process, simply retrieving the content at a URL will not reliably yield page content because many URLs redirect to other URLs via many different methods such as HTTP redirect, HTML meta redirect, JavaScript redirect, etc. In addition, the number of redirects is effectively unlimited, and some spammers use a high number of redirects to frustrate analysis. In addition, it is not sufficient to simply have lists of sites for which redirects should be handled as there are too many sites, and too many different methods for redirection.

In these cases, in some embodiments, URL analysis module 445 includes procedures, data, and/or instructions for implementing a set of processing rules that are applied to results of HTTP requests in a link-following system. In one embodiment, the HTTP response headers and content are analyzed to determine if the response is a redirect, the redirect is followed and the process is repeated as often as necessary (up to a limit) to obtain the page content.

As also seen in FIG. 4, in one embodiment, URL analysis process 103 module 441 of link following memory 430 includes expedited verdict transfer module 449 that includes procedures, data, and/or instructions for sending the results, or "verdict", of the URL analysis process, and URL analysis module 445, to verdict checking module 255 (FIG. 2) or 355 (FIG. 3) and/or URL block list 247 (FIG. 2) or 347 (FIG. 3) in an expedited and asynchronous manner.

As also seen in FIG. 4, in one embodiment, URL analysis process 103 module 441 of link following memory 430 includes standard verdict transfer module 451 that includes procedures, data, and/or instructions for sending the results, or "verdict", of the URL analysis process and URL analysis module 445 to verdict checking module 255 (FIG. 2) or 355 (FIG. 3) and/or URL block list 247 (FIG. 2) or 347 (FIG. 3) in an standard and asynchronous manner.

Those of skill in the art will readily recognize that the choice of components, data, modules, and information shown in FIG. 4, the organization of the components, data, modules, and information shown in FIG. 4, and the manner of storage and location of storage of the data, modules, and information shown in FIG. 4 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 4 are illustrative only and not limiting. In various other embodiments, the particular modules and/or data shown in FIG. 4 can be grouped together in fewer modules and/or data locations or divided among more modules and/or data locations. Consequently, those of skill in the art will recognize that other orders and/or grouping are possible and the particular modules and/or data, order, and/or grouping shown in FIG. 4 discussed herein do not limit the scope as claimed below.

A more detailed discussion of the operation of exemplary link following computing system 180, link following memory 430, and URL analysis process 103 module 441 of link following memory 430, is provided below with respect to FIG. 5A and FIG. 5B.

Process

According to one embodiment, a method and system for asynchronous analysis of URLs in messages in a live message processing environment includes a process for asynchronous analysis of URLs in messages in a live message processing environment whereby an incoming message enters a live message processing stream. In one embodiment, the message is analyzed to determine if the message contains any URLs and/or includes any defined further analysis message identification parameters such as, but not limited to: very little or no text, other that the URL, in the message body; senders with mixed reputation, such as web-based e-mail providers, being associated with the message, especially free web e-mail sources; the presence of shortened URLs and/or evidence of the use of a URL shortening service; or any other message parameters deemed to make a message worthy of further analysis.

In one embodiment, any URL included in a message identified for further analysis is extracted. In one embodiment, a message identified for further analysis is subjected to initial anti-spam analysis in the live message processing stream that can include checking any extracted URLs against a URL block list and/or performing various forms of non-URL-based anti-spam analysis. In one embodiment, if, at any point, a message is determined to be potential spam, protective action is taken based on the best spam data/verdict available, and/or the basis of the determination that the message is potential spam.

In one embodiment, if a message identified for further analysis is not initially determined to be potential spam, the extracted URL is prioritized based on one or more prioritization parameters such as, but not limited to: senders with mixed reputation, such as web-based e-mail providers, being associated with the message, especially free web e-mail sources; the presence of URL shortening links; or any other prioritization parameters that indicate the analysis of the extracted URL should be, or need not be, prioritized for expedited transmission and/or verdict rendering.

In one embodiment, any extracted and prioritized URL is then sent from the live message processing stream to a URL analysis process. In one embodiment, the live message processing stream is then stalled, with respect to that message, until the results of the URL analysis process are received, or until a defined "timeout" period passes.

In one embodiment, in the course of the URL analysis process, the message is analyzed by one or more URL analysis methods such as, but not limited to, analyzing portions of the URL, and/or activating the URL link to the associated location/website, and/or analyzing the contents of the web page linked to by the URL. In one embodiment, the results, or "verdict", of the URL analysis process are sent back to the live message processing stream. In one embodiment, if the URL is a "priority URL" that is prioritized for expedited transmission and/or verdict rendering, then the verdict of either "spam" or "non-spam" is provided to the live message processing stream on an expedited basis/timeframe and, if the URL is deemed spam, the URL is added to a URL block list.

In one embodiment, if the URL is a "non-priority URL" that is not prioritized for expedited transmission and/or verdict rendering, then the verdict of either "spam" or "non-spam" is provided to the live message processing stream on an standard basis/timeframe and, if the URL is deemed spam, the URL is added to the URL block list. In one embodiment, if the results of the URL analysis process are not received by the live message processing stream before the defined "timeout" period passes, then the "best" action is taken based on the best available data/verdict. In one embodiment, the best action may be, but is not limited to: allowing the message to pass to the user; blocking the message; and/or making a final static check of a known spam list and/or blocked URL list. In one embodiment, if the results of the URL analysis process are received by the live message processing stream before the defined "timeout" period passes, then the "best" action is taken based on the verdict provided by the URL analysis process.

Figure 5A:
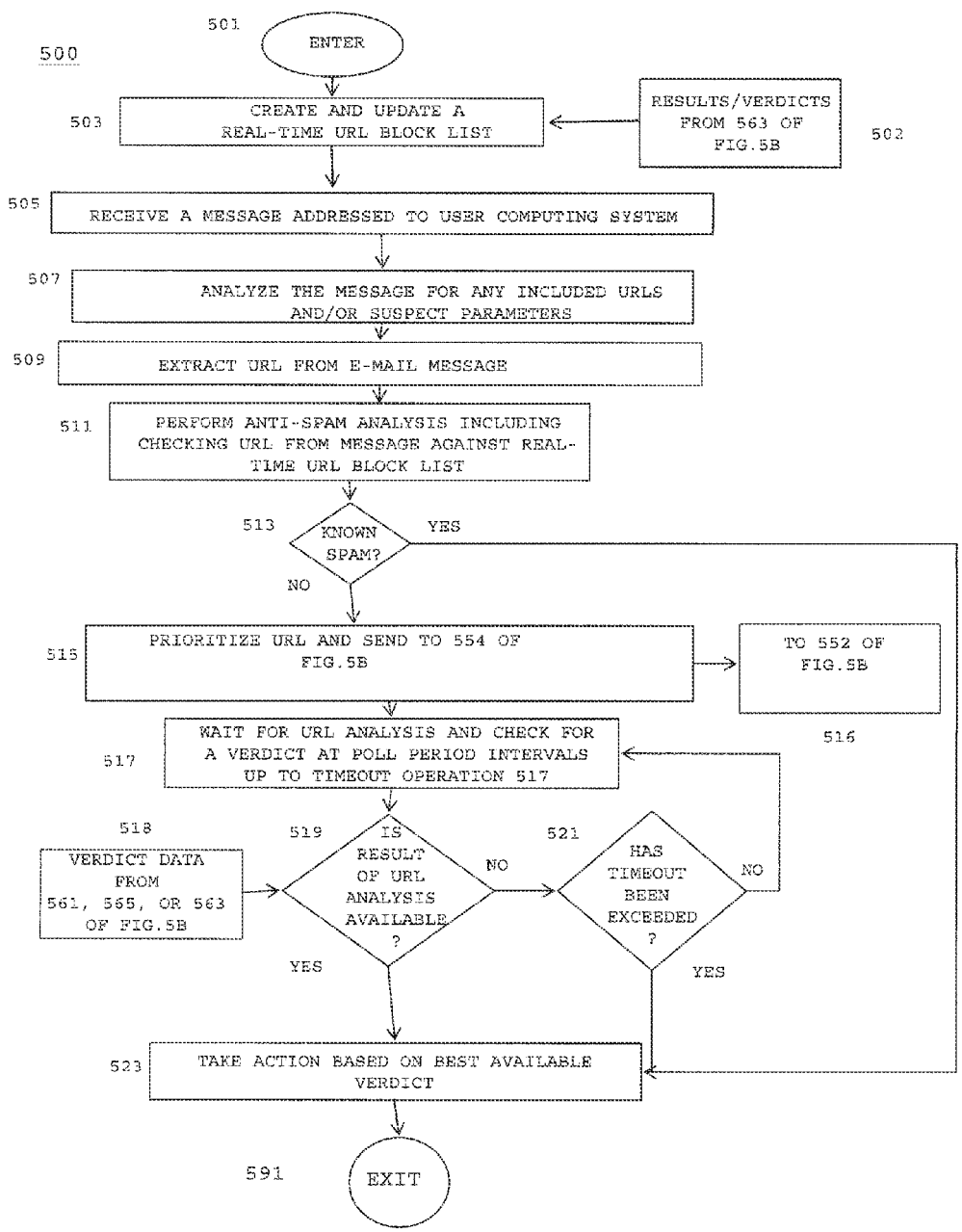
FIG. 5A and FIG. 5B together are a flow chart depicting a process for asynchronous analysis of URLs in messages in a live message processing environment, including a live message processing system and a URL analysis process, in accordance with one embodiment.
Figure 5B:
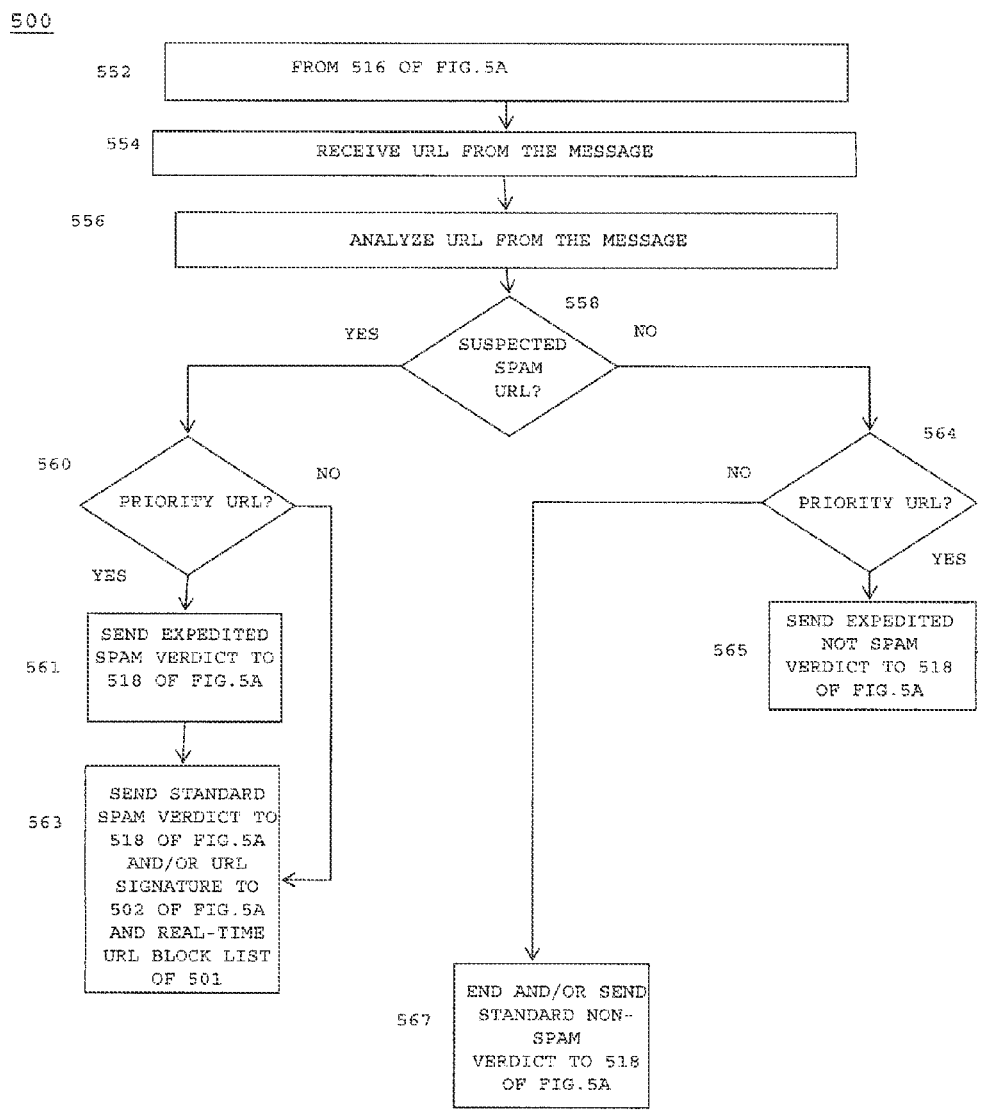

FIG. 5A and FIG. 5B are together a flow chart depicting a process for asynchronous analysis of URLs in messages in a live message processing environment 500 in accordance with one embodiment.

Process for asynchronous analysis of URLs in messages in a live message processing environment 500 begins at ENTER OPERATION 501 of FIG. 5A and process flow proceeds to CREATE AND UPDATE A REAL-TIME URL BLOCK LIST OPERATION 503.

In one embodiment, at CREATE AND UPDATE A REAL-TIME URL BLOCK LIST OPERATION 503 a "real-time"

URL block list is created and/or updated using URL analysis process results received at RESULTS/VERDICTS FROM 563 OF FIG. 5B OPERATION 502 from SEND STANDARD SPAM VERDICT TO 518 OF FIG. 5A AND/OR URL SIGNATURE TO 502 F. FIG. 5A AND REAL-TIME URL BLOCK LIST OF 501 OPERATION 563 and/or SEND EXPEDITED SPAM VERDICT TO 518 OF FIG. 5A OPERATION 561 of FIG. 5B.

As discussed below, in one embodiment, if the URL is a "non-priority URL" that is not prioritized for expedited transmission and/or verdict rendering, then the verdict of either "spam" or "non-spam" is provided to the live message processing stream on an standard basis/timeframe at SEND STANDARD SPAM VERDICT TO 518 OF FIG. 5A AND/OR URL SIGNATURE TO 502 OF FIG. 5A AND REAL-TIME URL BLOCK LIST OF 501 OPERATION 563 and, if the URL is deemed spam, the URL is added to the "real-time" URL block list of CREATE AND UPDATE A REAL-TIME URL BLOCK LIST OPERATION 503.

As also discussed below, in one embodiment, if the URL is a "priority URL" that is prioritized for expedited transmission and/or verdict rendering, then the verdict of either "spam" or "non-spam" from the URL analysis process is provided to the live message processing stream on an expedited basis/timeframe at SEND EXPEDITED NOT SPAM VERDICT TO 518 OF FIG. 5A OPERATION 565 and, if the URL is deemed spam, the URL is added to a "real-time" updated URL block list of CREATE AND UPDATE A REAL-TIME URL BLOCK LIST OPERATION 503.

In one embodiment, the "real-time" URL block list of CREATE AND UPDATE A REAL-TIME URL BLOCK LIST OPERATION 503 also includes data from other sources of spam related URLs.

In one embodiment, once a "real-time" URL block list is created and/or updated using URL analysis process results received at RESULTS/VERDICTS FROM 563 OF FIG. 5B OPERATION 502 from SEND STANDARD SPAM VERDICT TO 518 OF FIG. 5A AND/OR URL SIGNATURE TO 502 OF FIG. 5A AND REAL-TIME URL BLOCK LIST OF 501 OPERATION 563 and/or SEND EXPEDITED SPAM VERDICT TO 518 OF FIG. 5A OPERATION 561 of FIG. 5B at CREATE AND UPDATE A REAL-TIME URL BLOCK LIST OPERATION 503, process flow proceeds to RECEIVE A MESSAGE ADDRESSED TO USER COMPUTING SYSTEM OPERATION 505.

In one embodiment, at RECEIVE A MESSAGE ADDRESSED TO USER COMPUTING SYSTEM OPERATION 505 an incoming message in a live message stream addressed to a user computing system is intercepted and subjected to an anti-spam pipeline made up of multiple anti-spam stages or filters that includes a live mail non-URL analysis based anti-span screening process and a URL analysis process.

In one embodiment, at RECEIVE A MESSAGE ADDRESSED TO USER COMPUTING SYSTEM OPERATION 505 the incoming message in the live message stream is addressed to a user computing system, such as user computing system(s) 100 of FIG. 1 and FIG. 2.

Returning to FIG. 5A, in various embodiments, the live message processing system is represented by the operations shown in FIG. 5A and the URL analysis process is represented by the operations shown in FIG. 5B.

Returning to FIG. 5A, in various embodiments, the live message processing system of RECEIVE A MESSAGE ADDRESSED TO USER COMPUTING SYSTEM OPERATION 505 is an e-mail processing system.

Returning to FIG. 5A, in various embodiments, the live message processing system of RECEIVE A MESSAGE ADDRESSED TO USER COMPUTING SYSTEM OPERATION 505 is an e-mail processing system that is part of a security system implemented to analyze all e-mails coming into one or more user computing systems.

Returning to FIG. 5A, in various embodiments, the live message processing system of RECEIVE A MESSAGE ADDRESSED TO USER COMPUTING SYSTEM OPERATION 505 is live message processing system 101 of FIG. 1, implemented, at least in part, on a user computing system, such as user computing system(s) 100 of FIG. 1.

Returning to FIG. 5A, in various embodiments, the live message processing system of RECEIVE A MESSAGE ADDRESSED TO USER COMPUTING SYSTEM OPERATION 505 is live message processing system 101 of FIG. 1, implemented, at least in part, on a live message processing computing system, such as live message processing computing system 150 of FIG. 1. In various embodiments, the live message processing system is live message processing system 101 of FIG. 1, implemented, at least in part, on a security computing system, such as security computing system 190 of FIG. 1.

In one embodiment, once the incoming message in a live message stream addressed to a user computing system is intercepted and subjected to an anti-spam pipeline made up of multiple anti-spam stages or filters that includes a live mail non-URL analysis based anti-span screening process and a URL analysis process, at RECEIVE A MESSAGE ADDRESSED TO USER COMPUTING SYSTEM OPERATION 505, process flow proceeds to ANALYZE THE MESSAGE FOR ANY INCLUDED URLS AND/OR SUSPECT PARAMETERS OPERATION 507.

In one embodiment, at ANALYZE THE MESSAGE FOR ANY INCLUDED URLS AND/OR SUSPECT PARAMETERS OPERATION 507 the message received at RECEIVE A MESSAGE ADDRESSED TO USER COMPUTING SYSTEM OPERATION 505 is analyzed to determine if the message contains any URLs and/or includes any defined further analysis message identification parameters.

In one embodiment, at ANALYZE THE MESSAGE FOR ANY INCLUDED URLS AND/OR SUSPECT PARAMETERS OPERATION 507 the message received at RECEIVE A MESSAGE ADDRESSED TO USER COMPUTING SYSTEM OPERATION 505 is analyzed to determine if the message contains any URLs and/or includes any defined further analysis message identification parameters using one or more processors such as CPU(s) 201 of FIG. 2, CPU(s) 301 of FIG. 3, and/or CPU(s) 401 of FIG. 4, associated with one or more computing systems, such as user computing system(s) 100 of FIGS. 1 and 2, live message processing computing system 150 of FIGS. 1 and 3, and link following computing system 180 of FIGS. 1 and 4.

In various embodiments, the further analysis message identification parameters of ANALYZE THE MESSAGE FOR ANY INCLUDED URLS AND/OR SUSPECT PARAMETERS OPERATION 507 include, but not limited to, any one or more of: the message including very little, or no, text in the message body other that the URL; the presence of senders with mixed reputation, such as web-based e-mail providers, or other web-based message sources, being associated with the message, especially free web e-mail sources; the presence of shortened URLs and/or evidence of the use of a URL shortening service; the presence of free web hosting services including, but not limited to, "traditional" free hosting services, such as Tripod™, that host a whole site, as well as blogging platforms, such as Livejournal™, and document hosting services, such as Google Docs™ and Box.net™, and/or any site which freely allows users to upload or otherwise publish any content; or any other message parameters deemed to make a message worthy of further analysis.

In various embodiments, at ANALYZE THE MESSAGE FOR ANY INCLUDED URLS AND/OR SUSPECT PARAMETERS OPERATION 507 a heuristic rule process is employed to determine which messages will have their URLs subjected to the URL analysis process. As an example, if any heuristic rule has a particular tag or phrase in its name, then the URLs from any message matching that rule are subjected to the URL analysis process. This allows for the criteria for determining messages whose URLs are to be subjected to the URL analysis process to be defined using the full flexibility of a heuristics engine.

In one embodiment, once the message received at RECEIVE A MESSAGE ADDRESSED TO USER COMPUTING SYSTEM OPERATION 505 is analyzed to determine if the message contains any URLs and/or includes any defined further analysis message identification parameters at ANALYZE THE MESSAGE FOR ANY INCLUDED URLS AND/OR SUSPECT PARAMETERS OPERATION 507, process flow proceeds to EXTRACT URL FROM E-MAIL MESSAGE OPERATION 509.

In one embodiment, at EXTRACT URL FROM E-MAIL MESSAGE OPERATION 509, any URL included in the message identified for further analysis at ANALYZE THE MESSAGE FOR ANY INCLUDED URLS AND/OR SUSPECT PARAMETERS OPERATION 507 is extracted.

In one embodiment, at EXTRACT URL FROM E-MAIL MESSAGE OPERATION 509, any URL included in the message identified for further analysis at ANALYZE THE MESSAGE FOR ANY INCLUDED URLS AND/OR SUSPECT PARAMETERS OPERATION 507 is extracted using one or more processors such as CPU(s) 201 of FIG. 2, CPU(s) 301 of FIG. 3, and/or CPU(s) 401 of FIG. 4, associated with one or more computing systems, such as user computing system(s) 100 of FIGS. 1 and 2, live message processing computing system 150 of FIGS. 1 and 3, and link following computing system 180 of FIGS. 1 and 4.

Various methods, means, mechanisms, processes, and procedures for extracting URLs from messages are known in the art, consequently, a more detailed discussion of specific methods, means, mechanisms, processes, and procedures for extracting URLs from messages is omitted here to avoid detracting from the invention.

In one embodiment, once any URL included in the message identified for further analysis at ANALYZE THE MESSAGE FOR ANY INCLUDED URLS AND/OR SUSPECT PARAMETERS OPERATION 507 is extracted at EXTRACT URL FROM E-MAIL MESSAGE OPERATION 509, process flow proceeds to PERFORM ANTI-SPAM ANALYSIS INCLUDING CHECKING URL FROM MESSAGE AGAINST REAL-TIME URL BLOCK LIST OPERATION 511.

In one embodiment, at PERFORM ANTI-SPAM ANALYSIS INCLUDING CHECKING URL FROM MESSAGE AGAINST REAL-TIME URL BLOCK LIST OPERATION 511 the message identified for further analysis of at ANALYZE THE MESSAGE FOR ANY INCLUDED URLS AND/OR SUSPECT PARAMETERS OPERATION 507 is subjected to initial anti-spam analysis in the live message processing stream that can include, but is not limited to, checking any extracted URLs against the URL block list of CREATE AND UPDATE A REAL-TIME URL BLOCK LIST OPERATION 503 and/or performing various forms of non-URL-based anti-spam analysis.

In one embodiment, at PERFORM ANTI-SPAM ANALYSIS INCLUDING CHECKING URL FROM MESSAGE AGAINST REAL-TIME URL BLOCK LIST OPERATION 511 the extracted URL of EXTRACT URL FROM E-MAIL MESSAGE OPERATION 509 is checked against the URL block list of CREATE AND UPDATE A REAL-TIME URL BLOCK LIST OPERATION 503 to determine if the extracted URL is a known spam related URL.

In one embodiment, at PERFORM ANTI-SPAM ANALYSIS INCLUDING CHECKING URL FROM MESSAGE AGAINST REAL-TIME URL BLOCK LIST OPERATION 511 any one or more of various forms of non-URL-based anti-spam analysis are used such as, but not limited to: whitelist filtering; traditional heuristic filtering; dynamic feedback-based heuristic filtering; analysis of the text in the message body, headers, and footers; metadata analysis; and/or any combination of non-URL-based anti-spam analysis methods, as discussed herein, and/or as known in the art at the time of filing, and/or as developed after the time of filing.

In various embodiments, the analysis of PERFORM ANTI-SPAM ANALYSIS INCLUDING CHECKING URL FROM MESSAGE AGAINST REAL-TIME URL BLOCK LIST OPERATION 511 is performed by one or more processors such as CPU(s) 201 of FIG. 2, CPU(s) 301 of FIG. 3, and/or CPU(s) 401 of FIG. 4, associated with one or more computing systems, such as user computing system(s) 100 of FIGS. 1 and 2, live message processing computing system 150 of FIGS. 1 and 3, and link following computing system 180 of FIGS. 1 and 4.

As discussed below, in one embodiment, if, at any point, the message is determined to be potential spam, protective action is taken based on the best spam data/verdict available, and/or the basis of the determination that the message is potential spam.

Returning to FIG. 5A, in one embodiment, once the message identified for further analysis of ANALYZE THE MESSAGE FOR ANY INCLUDED URLS AND/OR SUSPECT PARAMETERS OPERATION 507 is subjected to initial anti-spam analysis in the live message processing stream that can include checking any extracted URLs against the URL block list of CREATE AND UPDATE A REAL-TIME URL BLOCK LIST OPERATION 503 and/or performing various forms of non-URL-based anti-spam analysis at PERFORM ANTI-SPAM ANALYSIS INCLUDING CHECKING URL FROM MESSAGE AGAINST REAL-TIME URL BLOCK LIST OPERATION 511, process flow proceeds to KNOWN SPAM? OPERATION 513.

In one embodiment, at KNOWN SPAM? OPERATION 513 an initial determination is made, based on the analysis of PERFORM ANTI-SPAM ANALYSIS INCLUDING CHECKING URL FROM MESSAGE AGAINST REAL-TIME URL BLOCK LIST OPERATION 511, as to whether the message is a known spam message.

In one embodiment, if at PERFORM ANTI-SPAM ANALYSIS INCLUDING CHECKING URL FROM MESSAGE AGAINST REAL-TIME URL BLOCK LIST OPERATION 511 the URL extracted at EXTRACT URL FROM E-MAIL MESSAGE OPERATION 509 matches a URL included in the URL block list of CREATE AND UPDATE A REAL-TIME URL BLOCK LIST OPERATION 503, and/or the message is determined to be potential spam based on the non-URL-based anti-spam analysis of PERFORM ANTI-SPAM ANALYSIS INCLUDING CHECKING URL FROM MESSAGE AGAINST REAL-TIME URL BLOCK LIST OPERATION 511, then a "YES" result is returned at KNOWN SPAM? OPERATION 513 and process flow proceeds directly to TAKE ACTION BASED ON BEST AVAILABLE VERDICT OPERATION 523.

In one embodiment, at TAKE ACTION BASED ON BEST AVAILABLE VERDICT OPERATION 523 one or more protective actions are taken based on the result of PERFORM ANTI-SPAM ANALYSIS INCLUDING CHECKING URL FROM MESSAGE AGAINST REAL-TIME URL BLOCK LIST OPERATION 511 and the "YES" response at KNOWN SPAM? OPERATION 513.

If, on the other hand, at PERFORM ANTI-SPAM ANALYSIS INCLUDING CHECKING URL FROM MESSAGE AGAINST REAL-TIME URL BLOCK LIST OPERATION 511 the URL extracted at EXTRACT URL FROM E-MAIL MESSAGE OPERATION 509 does not match a URL included in the URL block list of CREATE AND UPDATE A REAL-TIME URL BLOCK LIST OPERATION 503, and/or the message is not determined to be potential spam based on the non-URL-based anti-spam analysis of PERFORM ANTI-SPAM ANALYSIS INCLUDING CHECKING URL FROM MESSAGE AGAINST REAL-TIME URL BLOCK LIST OPERATION 511, then a "NO" result is returned at KNOWN SPAM? OPERATION 513 and process flow proceeds to PRIORITIZE URL AND SEND TO 554 OF FIG. 5B OPERATION 515.

In one embodiment, at PRIORITIZE URL AND SEND TO 554 OF FIG. 5B OPERATION 515 the extracted URL of EXTRACT URL FROM E-MAIL MESSAGE OPERATION 509 is prioritized based on one or more prioritization parameters and the extracted and prioritized URL is sent from the live message processing stream to a URL analysis process at TO 552 OF FIG. 5B OPERATION 516.

In one embodiment, at PRIORITIZE URL AND SEND TO 554 OF FIG. 5B OPERATION 515 if the message identified for further analysis is not initially determined to be potential spam at KNOWN SPAM? OPERATION 513, the extracted URL is prioritized based on one or more prioritization parameters such as, the of the use of a URL shortening service, or any other prioritization parameters that indicate the analysis of the extracted URL should be, or need not be, prioritized for expedited transmission and/or verdict rendering.

In one embodiment, the extracted URL is prioritized using one or more processors such as CPU(s) 201 of FIG. 2, CPU(s) 301 of FIG. 3, and/or CPU(s) 401 of FIG. 4, associated with one or more computing systems, such as user computing system(s) 100 of FIGS. 1 and 2, live message processing computing system 150 of FIGS. 1 and 3, and link following computing system 180 of FIGS. 1 and 4.

Returning to FIG. 5A, in one embodiment, at PRIORITIZE URL AND SEND TO 554 OF FIG. 5B OPERATION 515 the extracted, and now prioritized, URL is sent from the live message processing stream, and the live message processing system, at TO 552 OF FIG. 5B OPERATION 516, to FROM 516 OF FIG. 5A OPERATION 552 of a URL analysis process and RECEIVE URL FROM THE MESSAGE OPERATION 554 of FIG. 5B.

In one embodiment, once the extracted URL of EXTRACT URL FROM E-MAIL MESSAGE OPERATION 509 is prioritized based on one or more prioritization parameters and the extracted and prioritized URL is sent from the live message processing stream to a URL analysis process at TO 552 OF FIG. 5B OPERATION 516 and PRIORITIZE URL AND SEND TO 554 OF FIG. 5B OPERATION 515, process flow proceeds to WAIT FOR URL ANALYSIS AND CHECK FOR A VERDICT AT POLL PERIOD INTERVALS UP TO TIMEOUT OPERATION 517 of FIG. 5A, and FROM 516 OF FIG. 5A OPERATION 552 of FIG. 5B.

In one embodiment, at WAIT FOR URL ANALYSIS AND CHECK FOR A VERDICT AT POLL PERIOD INTERVALS UP TO TIMEOUT OPERATION 517 the live message processing stream is stalled with respect to the message of RECEIVE A MESSAGE ADDRESSED TO USER COMPUTING SYSTEM OPERATION 505 until the results of the URL analysis process are received, or until a defined "timeout" period passes.

In one embodiment, at WAIT FOR URL ANALYSIS AND CHECK FOR A VERDICT AT POLL PERIOD INTERVALS UP TO TIMEOUT OPERATION 517 once the extracted and prioritized URL is sent from the live message processing system to the URL analysis process, the live message processing stream is stalled with respect to that message for an initial wait period that is a fraction of the "timeout" period. In one embodiment, a check is made at "poll period" intervals to determine if the result, or verdict, is available from the URL analysis process. In various embodiments, the "poll period" is a fraction of the "timeout" period. In various embodiments, the verdict check is made at "poll period" intervals up to the end of the timeout period.

In various embodiments, the timeout period of WAIT FOR URL ANALYSIS AND CHECK FOR A VERDICT AT POLL PERIOD INTERVALS UP TO TIMEOUT OPERATION 517 can be any period desired by the provider of the process for asynchronous analysis of URLs in messages in a live message processing environment. In some embodiments, the timeout period can be any period desired by one or more users of the process for asynchronous analysis of URLs in messages in a live message processing environment and can be adjusted as desired. In one embodiment, the timeout period is ¼ of a second. In one embodiment, the timeout period is ⅛ of a second.

In one embodiment, at FROM 516 OF FIG. 5A OPERATION 552 the extracted, and now prioritized, URL is sent from the live message processing stream, and the live message processing system, of FIG. 5A, to a URL analysis process and RECEIVE URL FROM THE MESSAGE OPERATION 554 of FIG. 5B.

In one embodiment, at RECEIVE URL FROM THE MESSAGE OPERATION 554 of FIG. 5B the extracted, and now prioritized, URL is received for URL analysis processing.

In one embodiment, once the extracted, and now prioritized, URL is received for URL analysis processing at RECEIVE URL FROM THE MESSAGE OPERATION 554 of FIG. 5B, process flow proceeds to ANALYZE URL FROM THE MESSAGE OPERATION 556.

In one embodiment, at ANALYZE URL FROM THE MESSAGE OPERATION 556 the URL is analyzed by one or more URL analysis methods.

In one embodiment, at ANALYZE URL FROM THE MESSAGE OPERATION 556 the URL is analyzed by one or more URL analysis methods such as, but not limited to: analyzing various portions of the URL; activating the URL link to the associated location/website; and/or analyzing the contents of the web page linked to by the URL.

In one embodiment, simply retrieving the content at a URL at ANALYZE URL FROM THE MESSAGE OPERATION 556 will not reliably yield page content because many URLs redirect to other URLs via many different methods such as HTTP redirect, HTML meta redirect, JavaScript redirect, etc. In addition, the number of redirects is effectively unlimited, and some spammers use a high number of redirects to frustrate analysis. In addition, it is not sufficient to simply have lists of sites for which redirects should be handled as there are too many sites, and too many different methods for redirection.

In these cases, in some embodiments, at ANALYZE URL FROM THE MESSAGE OPERATION 556, a set of processing rules are applied to results of HTTP requests in a link-following system. In one embodiment, in the course of the URL analysis process, the HTTP response headers and content are analyzed to determine if the response is a redirect, the redirect is followed, and the process is repeated as often as necessary (up to a limit), to obtain the page content.

In some embodiments, at ANALYZE URL FROM THE MESSAGE OPERATION 556, a determination is made as to which type of redirect is in use and the URL content is obtained, traversing as many redirects as possible. However, care must be taken to avoid pitfalls in doing this like redirect loops, extremely long chains of redirects (used a denial of service attack of sorts), tar-pitting (very slow redirect) and so on. Related to this problem is that of tracking bugs, typically small pieces of code or images that must be executed or retrieved in order to obtain the page content required. Although in some cases it might be possible to retrieve content without retrieving the bug, often this lack of retrieving the bug is noted by the site's operator and will cause the connecting IP address to be banned (typically at DNS level) from all sites hosted on that system. A final related problem is that of DOM manipulation where an HTML page's content can be changed or even populated via JavaScript once the page is loaded. This can be an effective way of hiding content from naive link-following and redirect processing implementations.

In some embodiments, when processing the results of an HTTP request in a link-following (LF) system, the HTTP headers and content are analyzed to determine if the response is a redirect. Depending on the type of redirect detected, different actions are taken in order to follow the redirect or redirects (in the case of frames) and continue following redirects until actual page content is reached. For some types of redirect (frames), all URLs in the response must be retrieved, but for others, only a single URL must be followed.

In some embodiments, redirection is handled by recursion, meaning that the entirety of the link following (LF) engine is run on the destination or new URL as if it was an original URL. In this case, the original URL must be supplied to allow it to be blocked if necessary.

In various embodiments, the following types of URL-to-URL redirect are supported.

1. Interstitial pages, typically used by URL shortening services to warn users of potentially malicious content at the destination URL. Note that sometimes the mere presence of a page can be sufficient to block a URL. These redirects are matched with a combination of regular expressions (RE) (per domain) and content analysis. In some cases, the page indicates the short link has been deleted but does not provide the destination URL. In configurable cases, this can be taken as sufficient to allow a URL to be blocked.

2. Meta redirects (primitive redirect by use of an HTML tag). These can be matched with a RE.

3. JavaScript (JS) redirects including pop-ups, window.location redirects and DOM manipulation. These can mostly be matched with a RE. In one embodiment, JS is executed directly. Dynamic limits are used to limit the number of redirects followed. Redirect loops are detected and avoided. Frames (including inline) are also supported, defining a frameset, specifying a URL for each frame. Each frame is recursed into, following any additional frames/redirects. For each frame URL, the recursion limit is reset.

To maintain effectiveness, in some embodiments, tracking bugs are also retrieved. Site owners use these to track users and also frustrate analysis. If a bug is present but not retrieved, often the site will be delivered once, but subsequent requests will fail, as the IP address will be automatically blocked at DNS level by the site. This prevents access to any site hosted on the same service.

Pages can also be modified dynamically by JS altering the page's DOM. In this case, the JS is analyzed, looking for embedded content (often obfuscated) and embedded URLs, handling these like frames. Executing the JS as planned will improve this.

In one embodiment, at ANALYZE URL FROM THE MESSAGE OPERATION 556 the URL is analyzed by one or more URL analysis methods using one or more processors such as CPU(s) 201 of FIG. 2, CPU(s) 301 of FIG. 3, and/or CPU(s) 401 of FIG. 4, associated with one or more computing systems, such as user computing system(s) 100 of FIGS. 1 and 2, live message processing computing system 150 of FIGS. 1 and 3, and link following computing system 180 of FIGS. 1 and 4.

Returning to FIG. 5B, in one embodiment, once the URL is analyzed by one or more URL analysis methods at ANALYZE URL FROM THE MESSAGE OPERATION 556, process flow proceeds to SUSPECTED SPAM URL? OPERATION 558.

In one embodiment, at SUSPECTED SPAM URL? OPERATION 558 a determination is made, based on the analysis of ANALYZE URL FROM THE MESSAGE OPERATION 556, as to whether the URL of EXTRACT URL FROM E-MAIL MESSAGE OPERATION 509 is a spam related URL or a non-spam related URL and the results, or "verdict", of the URL analysis process are sent back to the live message processing stream, and FIG. 5A.

In one embodiment, if, at SUSPECTED SPAM URL? OPERATION 558, a determination is made, based on the analysis of ANALYZE URL FROM THE MESSAGE OPERATION 556, that the URL of EXTRACT URL FROM E-MAIL MESSAGE OPERATION 509 is a spam related URL, then process flow proceeds to PRIORITY URL? OPERATION 560.

In one embodiment, at PRIORITY URL? OPERATION 560 a determination is made as to whether the now identified spam URL is a "priority URL" that is prioritized for expedited transmission and/or verdict rendering or a "non-priority URL" for standard analysis.

In one embodiment, if at PRIORITY URL? OPERATION 560 a determination is made that the now identified spam URL is a "priority URL", then process flow proceeds to SEND EXPEDITED SPAM VERDICT TO 518 OF FIG. 5A OPERATION 561.

In one embodiment, at SEND EXPEDITED SPAM VERDICT TO 518 OF FIG. 5A OPERATION 561 the verdict of "spam" from PERFORM ANTI-SPAM ANALYSIS INCLUDING CHECKING URL FROM MESSAGE AGAINST REAL-TIME URL BLOCK LIST OPERATION 511 and KNOWN SPAM? OPERATION 513 is provided back to the live message processing stream of FIG. 5A, and IS RESULT OF URL ANALYSIS AVAILABLE? OPERATION 519 at VERDICT DATA FROM 561, 565, OR 563 OF FIG. 5B OPERATION 518 in an expedited manner/timeframe and the URL is added to the URL block list of CREATE AND UPDATE A REAL-TIME URL BLOCK LIST OPERATION 503 at SEND STANDARD SPAM VERDICT TO 518 OF FIG. 5A AND/OR URL SIGNATURE TO 502 OF FIG. 5A AND REAL-TIME URL BLOCK LIST OF 501 OPERATION 563.

In one embodiment, if at PRIORITY URL? OPERATION 560 a determination is made that the now identified spam URL is a "non-priority URL", then process flow proceeds to SEND STANDARD SPAM VERDICT TO 518 OF FIG. 5A AND/OR URL SIGNATURE TO 502 OF FIG. 5A AND REAL-TIME URL BLOCK LIST OF 501 OPERATION 563.

In one embodiment, at SEND STANDARD SPAM VERDICT TO 518 OF FIG. 5A AND/OR URL SIGNATURE TO 502 OF FIG. 5A AND REAL-TIME URL BLOCK LIST OF 501 OPERATION 563 the verdict of "spam" from PERFORM ANTI-SPAM ANALYSIS INCLUDING CHECKING URL FROM MESSAGE AGAINST REAL-TIME URL BLOCK LIST OPERATION 511 and KNOWN SPAM? OPERATION 513 is provided back to the live message processing stream of FIG. 5A, and IS RESULT OF URL ANALYSIS AVAILABLE? OPERATION 519 at VERDICT DATA FROM 561, 565, OR 563 OF FIG. 5B OPERATION 518 in a standard manner/timeframe and the URL is added to the URL block list of CREATE AND UPDATE A REAL-TIME URL BLOCK LIST OPERATION 503.

In one embodiment, if, at SUSPECTED SPAM URL? OPERATION 558, a determination is made, based on the analysis of ANALYZE URL FROM THE MESSAGE OPERATION 556, that the URL of EXTRACT URL FROM E-MAIL MESSAGE OPERATION 509 is not a spam related URL, then process flow proceeds to PRIORITY URL? OPERATION 564.

In one embodiment, at PRIORITY URL? OPERATION 564 a determination is made as to whether the now identified non-spam URL is a "priority URL" that is prioritized for expedited transmission and/or verdict rendering or a "non-priority URL" for standard analysis.

In one embodiment, if at PRIORITY URL? OPERATION 564 a determination is made that the now identified non-spam URL is a "priority URL", then process flow proceeds to SEND EXPEDITED NOT SPAM VERDICT TO 518 OF FIG. 5A OPERATION 565.

In one embodiment, at SEND EXPEDITED NOT SPAM VERDICT TO 518 OF FIG. 5A OPERATION 565 the verdict of "non-spam" from PERFORM ANTI-SPAM ANALYSIS INCLUDING CHECKING URL FROM MESSAGE AGAINST REAL-TIME URL BLOCK LIST OPERATION 511 and KNOWN SPAM? OPERATION 513 is provided back to the live message processing stream of FIG. 5A, and IS RESULT OF URL ANALYSIS AVAILABLE? OPERATION 519 at VERDICT DATA FROM 561, 565, OR 563 OF FIG. 5B OPERATION 518 in an expedited manner/timeframe.

In one embodiment, if, at PRIORITY URL? OPERATION 564, a determination is made that the now identified non-spam URL is a "non-priority URL", then process flow proceeds to END AND/OR SEND STANDARD NON-SPAM VERDICT TO 518 OF FIG. 5A OPERATION 567.

In one embodiment, at END AND/OR SEND STANDARD NON-SPAM VERDICT TO 518 OF FIG. 5A OPERATION 567 the URL analysis process of FIG. 5B ends and process flow proceeds back to the live message processing stream of FIG. 5A, In one embodiment, at END AND/OR SEND STANDARD NON-SPAM VERDICT TO 518 OF FIG. 5A OPERATION 567 the verdict of "non-spam" from PERFORM ANTI-SPAM ANALYSIS INCLUDING CHECKING URL FROM MESSAGE AGAINST REAL-TIME URL BLOCK LIST OPERATION 511 and KNOWN SPAM? OPERATION 513 is provided back to the live message processing stream of FIG. 5A, and IS RESULT OF URL ANALYSIS AVAILABLE? OPERATION 519 at VERDICT DATA FROM 561, 565, OR 563 OF FIG. 5B OPERATION 518 in a standard manner/timeframe.

In one embodiment, once the verdict of spam or non-spam URL is determined, and the priority of the URL is established, process flow proceeds back to the live message stream and system of FIG. 5A and VERDICT DATA FROM 561, 565, OR 563 OF FIG. 5B OPERATION 518.

As noted above, in various embodiments, the live message processing stream is stalled with respect to the message of RECEIVE A MESSAGE ADDRESSED TO USER COMPUTING SYSTEM OPERATION 505 at WAIT FOR URL ANALYSIS AND CHECK FOR A VERDICT AT POLL PERIOD INTERVALS UP TO TIMEOUT OPERATION 517 until the results of the URL analysis process are received, or until a defined "timeout" period passes.

In one embodiment, process flow proceeds from WAIT FOR URL ANALYSIS AND CHECK FOR A VERDICT AT POLL PERIOD INTERVALS UP TO TIMEOUT OPERATION 517 to IS RESULT OF URL ANALYSIS AVAILABLE? OPERATION 519.

In one embodiment, at IS RESULT OF URL ANALYSIS AVAILABLE? OPERATION 519 a determination is made as to whether a verdict or result has been received from the URL analysis process of FIG. 5B regarding the URL of EXTRACT URL FROM E-MAIL MESSAGE OPERATION 509 at VERDICT DATA FROM 561, 565, OR 563 OF FIG. 5B OPERATION 518.

In one embodiment, if at IS RESULT OF URL ANALYSIS AVAILABLE? OPERATION 519 it is determined that the verdict or result has been received from the URL analysis process of FIG. 5B regarding the URL of EXTRACT URL FROM E-MAIL MESSAGE OPERATION 509 at VERDICT DATA FROM 561, 565, OR 563 OF FIG. 5B OPERATION 518, then process flow proceeds directly to TAKE ACTION BASED ON BEST AVAILABLE VERDICT OPERATION 523.

In one embodiment, if at IS RESULT OF URL ANALYSIS AVAILABLE? OPERATION 519 it is determined that the verdict or result has not been received from the URL analysis process of FIG. 5B regarding the URL of EXTRACT URL FROM E-MAIL MESSAGE OPERATION 509 at VERDICT DATA FROM 561, 565, OR 563 OF FIG. 5B OPERATION 518, then process flow proceeds to HAS TIMEOUT BEEN EXCEEDED? OPERATION 521.

In one embodiment, at HAS TIMEOUT BEEN EXCEEDED? OPERATION 521 a determination is made as to whether the timeout period of WAIT FOR URL ANALYSIS AND CHECK FOR A VERDICT AT POLL PERIOD INTERVALS UP TO TIMEOUT OPERATION 517 has expired.

In one embodiment, if, at HAS TIMEOUT BEEN EXCEEDED? OPERATION 521, a determination is made that the timeout period of WAIT FOR URL ANALYSIS AND CHECK FOR A VERDICT AT POLL PERIOD INTERVALS UP TO TIMEOUT OPERATION 517 has not expired, then process flow proceeds back to WAIT FOR URL ANALYSIS AND CHECK FOR A VERDICT AT POLL PERIOD INTERVALS UP TO TIMEOUT OPERATION 517 and IS RESULT OF URL ANALYSIS AVAILABLE? OPERATION 519 until either the verdict results are received at VERDICT DATA FROM 561, 565, OR 563 OF FIG. 5B OPERATION 518, or the timeout period does expire.

In one embodiment, if at HAS TIMEOUT BEEN EXCEEDED? OPERATION 521 a determination is made that the timeout period of WAIT FOR URL ANALYSIS AND CHECK FOR A VERDICT AT POLL PERIOD INTERVALS UP TO TIMEOUT OPERATION 517 has expired, then process flow proceeds to TAKE ACTION BASED ON BEST AVAILABLE VERDICT OPERATION 523.

In one embodiment, at TAKE ACTION BASED ON BEST AVAILABLE VERDICT OPERATION 523 the "best" action is taken based on the data available within the timeout period of WAIT FOR URL ANALYSIS AND CHECK FOR A VERDICT AT POLL PERIOD INTERVALS UP TO TIMEOUT OPERATION 517.

In various embodiments, at TAKE ACTION BASED ON BEST AVAILABLE VERDICT OPERATION 523, if the results of the URL analysis process are not received by the live message processing stream before the defined "timeout" period passes, then the "best" action is taken based on the best available data/verdict.

In various embodiments, the best action may be, but is not limited to: allowing the message to pass to the user computing system, thereby risking passing on spam messages; blocking the message from the user computing system, thereby risking the blocking of legitimate messages; and/or making a final static check of a known spam list and/or the updated blocked URL list.

In various embodiments, at TAKE ACTION BASED ON BEST AVAILABLE VERDICT OPERATION 523, if the results of the URL analysis process are received by the live message processing stream before the defined "timeout" period passes, then the "best" action is taken based on the verdict provided by the URL analysis process and VERDICT DATA FROM 561, 565, OR 563 OF FIG. 5B OPERATION 518.

In one embodiment, once the "best" action is taken based on the data available within the timeout period of WAIT FOR URL ANALYSIS AND CHECK FOR A VERDICT AT POLL PERIOD INTERVALS UP TO TIMEOUT OPERATION 517 at TAKE ACTION BASED ON BEST AVAILABLE VERDICT OPERATION 523, process flow proceeds to EXIT OPERATION 591. In one embodiment, at EXIT OPERATION 591 process for asynchronous analysis of URLs in messages in a live message processing environment 500 is exited to await new data.

Using one embodiment of process for asynchronous analysis of URLs in messages in a live message processing environment 500, potential spam messages, even very short spam messages, from semi-legitimate sources, and with shortened URLs that are included in very few spam messages, can be reliably identified in a live message stream, i.e., in relative "real time". In addition, using process for asynchronous analysis of URLs in messages in a live message processing environment 500, both messages and URLs are analyzed and/or filtered to identify those messages and URLs requiring further analysis, thereby conserving resources and minimizing delays. In addition, in one embodiment, URLs identified as requiring further analysis are prioritized and analyzed at the same time non-URL-based anti-spam analysis is conducted in the live message stream. Consequently, the delay to the end user is again minimized. In addition, using one embodiment of process for asynchronous analysis of URLs in messages in a live message processing environment 500, the timeout period can be set and/or adjusted so that the maximum delay to the end user is controlled and/or adjustable.

As a result, using process for asynchronous analysis of URLs in messages in a live message processing environment 500, far more spam messages can be identified and stopped than is possible using currently available methods and systems.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "analyzing", "accessing", "calculating", "capturing", "classifying", "comparing", "defining", "detecting", "determining", "distributing", "encrypting", "extracting", "filtering", "generating", "implementing", "monitoring", "obtaining", "processing", "providing", "receiving", "requesting", "saving", "sending", "storing", "transferring", "transforming", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, and/or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for asynchronous analysis of URLs in messages in a live message processing environment comprising:

a live message processing system receiving a message addressed to a user computing system, the message including a URL;

using one or more processors to extract the URL from the message while the message is in the live message processing system;

using one or more processors to analyze the message and the extracted URL to identify one or more defined prioritization parameters while the message is in the live message processing system, the process being configured so that identification is at least partly based on the one or more identified prioritization parameters including whether evidence exists of the use of a URL shortening service with respect to the extracted URL;

using one or more processors to prioritize the extracted URL for either expedited or standard processing based the analysis of the message and extracted URL, and any identified prioritization parameters, while the message is in the live message processing system;

using one or more processors to transfer the extracted and prioritized URL to a URL analysis process for URL analysis;

using one or more processors to stall the processing of the message by the live message processing system for a defined timeout period while the extracted and prioritized is being analyzed by the URL analysis process, the timeout period being adjustable by a user of the user computing system;

using one or more processors to analyze the extracted and prioritized using the URL analysis process;

periodically polling the URL analysis process to determine whether a determination has been made as to whether the extracted and prioritized URL is spam;

as a result of the URL analysis process, using one or more processors to generate URL analysis results indicating whether the extracted and prioritized URL is "spam" or "not spam";

using one or more processors to determine if the extracted URL is prioritized as an expedited or standard URL, including consideration of whether the extracted URL is a shortened URL, wherein if the extracted URL is a shortened URL, the extracted URL is prioritized as an expedited URL, wherein an expedited URL is processed more quickly than a nonexpedited URL;

if the extracted and prioritized URL is prioritized as an expedited URL, using one or more processors to transfer the URL analysis results associated with the extracted and prioritized URL to the live message processing system on an expedited basis;

if the extracted and prioritized URL is not prioritized as an expedited URL and thus is prioritized as a standard URL, using one or more processors to transfer the URL analysis results associated with the extracted and prioritized URL to the live message processing system on standard basis;

using one or more processors to resume the processing of the message by the live message processing system when either the timeout period has elapsed or when it is determined that the URL analysis results associated with the extracted and prioritized URL have been obtained;

if the URL analysis results associated with the extracted and prioritized URL have been obtained within the timeout period, using one or more processors to process the message in accordance with the URL analysis results associated with the extracted and prioritized URL; and if the URL analysis results associated with the extracted and prioritized URL have not been obtained within the timeout period, using one or more processors to process the message in accordance with the data available at the time the timeout period elapses.

2. The computing system implemented process for asynchronous analysis of URLs in messages in a live message processing environment of claim 1, wherein:
at least one of the defined prioritization parameters is selected from the group of prioritization parameters consisting of:
the message including very little, or no, text in the message body other that the URL;
the presence of senders with mixed reputation, such as web-based e-mail providers, or other web-based message sources, associated with the message;
the presence of traditional free web hosting services;
the presence of blogging platforms; and
the presence of document hosting services.

3. The computing system implemented process for asynchronous analysis of URLs in messages in a live message processing environment of claim 1, further comprising:
prior to extracting the URL, subjecting the message to at least one non-URL anti-spam based analysis to determine if the message requires further analysis.

4. The computing system implemented process for asynchronous analysis of URLs in messages in a live message processing environment of claim 1, further comprising:
while the extracted and prioritized URL is being analyzed using the URL analysis process, subjecting the message to at least one non-URL anti-spam based analysis.

5. The computing system implemented process for asynchronous analysis of URLs in messages in a live message processing environment of claim 1, further comprising:
providing a URL block list and checking the extracted URL against the URL block list before transferring the extracted and prioritized URL to the URL analysis process.

6. The computing system implemented process for asynchronous analysis of URLs in messages in a live message processing environment of claim 5, further comprising:
if the URL analysis results associated with the extracted and prioritized URL indicate the extracted and prioritized URL is "spam", adding the extracted and prioritized URL to the URL block list.

7. The computing system implemented process for asynchronous analysis of URLs in messages in a live message processing environment of claim 1, wherein:
if the URL analysis results associated with the extracted and prioritized URL have not been obtained within the timeout period, processing the message in accordance with the best data available at the time the timeout period elapses includes taking one of the actions selected form the group of action consisting of:
allowing the message to pass to the user computing system;
blocking the message from the user computing system; and
making a final check of the extracted and prioritized URL against a blocked URL list before passing the message to, or blocking the message from, the user computing system.

8. A system for asynchronous analysis of URLs in messages in a live message processing environment comprising:
a user computing system;
a live message processing system;
a URL analysis process;
a message in the live message stream directed to the user computing system; and
one or more processors associated with one or more computing systems, the one or more processors implementing a process for asynchronous analysis of URLs in messages in a live message processing environment, the process for asynchronous analysis of URLs in messages in a live message processing environment comprising:
receiving the message in the live message stream at the live message processing system, the message including a URL;
using the one or more processors associated with one or more computing systems to extract the URL from the message while the message is in the live message processing system;
using the one or more processors associated with one or more computing systems to analyze the message and the extracted URL to identify one or more defined prioritization parameters while the message is in the live message processing system, the system being configured so that identification is at least partly based on the one or more identified prioritization parameters including whether the extracted URL is a shortened URL;
using the one or more processors associated with one or more computing systems to prioritize the extracted URL for either expedited or standard processing based the analysis of the message and the extracted URL, and any identified prioritization parameters, while the message is in the live message processing system;
using the one or more processors associated with one or more computing systems to transfer the extracted and prioritized URL to the URL analysis process for URL analysis;
using the one or more processors associated with one or more computing systems to stall the processing of the message by the live message processing system for a defined timeout period while the extracted and prioritized is being analyzed by the URL analysis process, the timeout period being adjustable by a user of the user computing system;
using the one or more processors associated with one or more computing systems to analyze the extracted and prioritized URL using the URL analysis process;
periodically polling the URL analysis process to determine whether a determination has been made as to whether the extracted and prioritized URL is spam;
as a result of the URL analysis process, using the one or more processors associated with one or more computing systems to generate URL analysis results indicating whether the extracted and prioritized URL is "spam" or "not spam";
using the one or more processors associated with one or more computing systems to determine that the extracted URL is prioritized as one of either an expedited URL or a standard URL, including consideration of whether evidence exists of the use of a URL shortening service with respect to the extracted URL, wherein if the extracted URL is a shortened URL, the extracted URL is prioritized as an expedited URL, wherein an expedited URL is processed more quickly than a nonexpedited URL;
if the extracted and prioritized URL is prioritized as an expedited URL, using the one or more processors associated with one or more computing systems to transfer the URL analysis results associated with the extracted and prioritized URL to the live message processing system on an expedited basis;
if the extracted and prioritized URL is not prioritized as an expedited URL and thus is prioritized as a standard URL, using the one or more processors associated with one or more computing systems to transfer the URL analysis results associated with the extracted and prioritized URL to the live message processing system on standard basis;

using the one or more processors associated with one or more computing systems to resume the processing of the message by the live message processing system when either the timeout period has elapsed or when it is determined that the URL analysis results associated with the extracted and prioritized URL have been obtained;

if the URL analysis results associated with the extracted and prioritized URL have been obtained within the timeout period, using the one or more processors associated with one or more computing systems to process the message in accordance with the URL analysis results associated with the extracted and prioritized URL; and if the URL analysis results associated with the extracted and prioritized URL have not been obtained within the timeout period, using the one or more processors associated with one or more computing systems to process the message in accordance with the data available at the time the timeout period elapses.

9. The system for asynchronous analysis of URLs in messages in a live message processing environment of claim 8, wherein:

at least one of the defined prioritization parameters is selected from the group of prioritization parameters consisting of:

the message including very little, or no, text in the message body other that the URL;

the presence of senders with mixed reputation, such as web-based e-mail providers, or other web-based message sources, associated with the message;

the presence of blogging platforms; and the presence of document hosting services.

10. The system for asynchronous analysis of URLs in messages in a live message processing environment of claim 8, wherein, the process for asynchronous analysis of URLs in messages in a live message processing environment further comprises:

prior to extracting the URL, subjecting the message to at least one non-URL anti-spam based analysis to determine if the message requires further analysis.

11. The system for asynchronous analysis of URLs in messages in a live message processing environment of claim 8, wherein, the process for asynchronous analysis of URLs in messages in a live message processing environment further comprises:

while the extracted and prioritized URL is being analyzed using the URL analysis process, subjecting the message to at least one non-URL anti-spam based analysis.

12. The system for asynchronous analysis of URLs in messages in a live message processing environment of claim 8, wherein, the process for asynchronous analysis of URLs in messages in a live message processing environment further comprises:

providing a URL block list and checking the extracted URL against the URL block list before transferring the extracted and prioritized URL to the URL analysis process.

13. The system for asynchronous analysis of URLs in messages in a live message processing environment of claim 12, wherein, the process for asynchronous analysis of URLs in messages in a live message processing environment further comprises:

if the URL analysis results associated with the extracted and prioritized URL indicate the extracted and prioritized URL is "spam", adding the extracted and prioritized URL to the URL block list.

* * * * *

UNITED STATES PATENT AND TRADEMARK OFFICE
CERTIFICATE OF CORRECTION

| | | |
|---|---|---|
| PATENT NO. | : 8,862,675 B1 | Page 1 of 1 |
| APPLICATION NO. | : 13/045267 | |
| DATED | : October 14, 2014 | |
| INVENTOR(S) | : Graham Coomer et al. | |

It is certified that error appears in the above-identified patent and that said Letters Patent is hereby corrected as shown below:

In the Claims

At column 30, claim 1, line 26 should read as follows:

"tized <u>URL</u> is being analyzed by the URL analysis process,"

Signed and Sealed this
Seventh Day of April, 2015

Michelle K. Lee
*Director of the United States Patent and Trademark Office*